(12) United States Patent
Felgentreff et al.

(10) Patent No.: US 12,395,973 B1
(45) Date of Patent: Aug. 19, 2025

(54) LOW-LATENCY APPLICATION DATA TRANSMISSION

(71) Applicant: Nokia Solutions and Networks Oy, Espoo (FI)

(72) Inventors: Tilman Felgentreff, Ulm (DE); Gunter Wolff, Ulm (DE); Hartmut Wilhelm, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/081,116

(22) Filed: Mar. 17, 2025

(30) Foreign Application Priority Data

Mar. 28, 2024 (FI) ...................................... 20245372

(51) Int. Cl.
| | |
|---|---|
| *H04W 72/12* | (2023.01) |
| *H04L 1/00* | (2006.01) |
| *H04W 72/0446* | (2023.01) |
| *H04W 72/512* | (2023.01) |

(52) U.S. Cl.
CPC ....... *H04W 72/0446* (2013.01); *H04L 1/0003* (2013.01); *H04W 72/12* (2013.01); *H04W 72/512* (2023.01)

(58) Field of Classification Search
CPC .................................................. H04W 72/12
USPC ....................................................... 370/329
See application file for complete search history.

(56) References Cited

U.S. PATENT DOCUMENTS

| | | |
|---|---|---|
| 2016/0234857 A1 | 8/2016 | Chen et al. |
| 2016/0255592 A1 | 9/2016 | Lee |
| 2017/0013618 A1 | 1/2017 | Shin |
| 2018/0083758 A1 | 3/2018 | Islam et al. |
| 2022/0345094 A1 | 10/2022 | Durante et al. |
| 2023/0254064 A1 | 8/2023 | Zou et al. |
| 2024/0048296 A1 | 2/2024 | Bala et al. |

FOREIGN PATENT DOCUMENTS

| | | |
|---|---|---|
| CN | 115334662 A | 11/2022 |
| EP | 2254237 A2 | 11/2010 |
| EP | 2996406 B1 | 7/2020 |

(Continued)

OTHER PUBLICATIONS

"3rd Generation Partnership Project; Technical Specification Group Radio Access Network; Nr; Nr and NG-RAN Overall Description; Stage 2 (Release 18)", 3GPP TS 38.300, V18.0.0, Dec. 2023, pp. 1-265.

(Continued)

*Primary Examiner* — Angel T Brockman
(74) *Attorney, Agent, or Firm* — Nokia Technologies Oy

(57) ABSTRACT

The present subject matter relates to a transmitter that is configured for receiving a sequence of datasets of a low-latency application, each dataset of the datasets comprising a succession of a first sub-dataset and a second sub-dataset; successively transmitting radio frequency signals in an order of the sequence of the datasets such that the number of radio frequency signals is equal to the number of datasets, each radio frequency signal of the radio frequency signals comprising a dataset of the datasets; wherein the transmitting of the radio frequency signals is performed such that: a minimum fraction of starting points of time of the radio frequency signals is in an earliest scheduling time slot or in an earliest but one scheduling time slot of a transmission period of the transmission periods.

20 Claims, 12 Drawing Sheets

(56) References Cited

FOREIGN PATENT DOCUMENTS

| | | |
|---|---|---|
| EP | 3787212 A1 | 3/2021 |
| EP | 4216484 A1 | 7/2023 |
| WO | 2022/094510 A1 | 5/2022 |
| WO | 2022/271179 A1 | 12/2022 |

OTHER PUBLICATIONS

Office Action received for corresponding Finnish Patent Application No. 20245372, dated Nov. 1, 2024, 14 pages.
Extended European Search Report received for corresponding European Patent Application No. 25159568.2, dated Jun. 17, 2025, 7 pages.

LOW-LATENCY APPLICATION DATA TRANSMISSION

RELATED APPLICATION

This application claims benefit of priority from Finnish Patent App. No 20245372, filed Mar. 28, 2024, the disclosure of which is hereby incorporated in its entirety by reference herein.

TECHNICAL FIELD

Various example embodiments relate to telecommunication systems, and more particularly to transmission of application data.

BACKGROUND

Wireless communication systems have become a cornerstone of modern society, enabling seamless connectivity and data transmission across vast distances. One of the key challenges in wireless communication may be the efficient utilization of the available spectrum. In addition, these systems rely on a multitude of components to function effectively, one of which is the power amplifier (PA). The power amplifier may play a crucial role in the transmission of data, as it amplifies the signal to be transmitted, ensuring that the signal can travel the necessary distance to reach the intended receiver.

SUMMARY

Example embodiments provide a transmitter for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, wherein the transmitter is configured for: receiving a sequence of datasets of a low-latency application, each dataset of the datasets comprising a succession of a first sub-dataset and a second sub-dataset; successively transmitting radio frequency (RF) signals in an order of the sequence of the datasets such that the number of radio frequency signals is equal to the number of datasets, each radio frequency signal of the radio frequency signals comprising a dataset of the datasets; wherein each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration longer than or equal to a minimum duration; and a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, each second time segment of the second time segments having a starting point of time; wherein the transmitter is configured to perform the transmitting of the radio frequency signals such that: a minimum fraction of the starting points of time is adjacent to the end of the first time segment and in an earliest scheduling time slot or in an earliest but one scheduling time slot of a transmission period of the transmission periods.

Example embodiments provide a method for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, the method comprising:

receiving a sequence of datasets of a low-latency application, each dataset of the datasets comprising a succession of a first sub-dataset and a second sub-dataset;
    successively transmitting radio frequency signals in an order of the sequence of the datasets such that the number of radio frequency signals is equal to the number of datasets, each radio frequency signal of the radio frequency signals comprising a dataset of the datasets; wherein each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration longer than or equal to a minimum duration; and a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, each second time segment of the second time segments having a starting point of time; wherein the transmitting of the radio frequency signals is performed such that: a minimum fraction of the starting points of time is adjacent to the end of the first time segment and in an earliest scheduling time slot or in an earliest but one scheduling time slot of a transmission period of the transmission periods.

Example embodiments provide a computer program for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, the computer program comprising instructions for causing a transmitter for performing at least the following:

receiving a sequence of datasets of a low-latency application, each dataset of the datasets comprising a succession of a first sub-dataset and a second sub-dataset; successively transmitting radio frequency signals in an order of the sequence of the datasets such that the number of radio frequency signals is equal to the number of datasets, each radio frequency signal of the radio frequency signals comprising a dataset of the datasets; wherein each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration longer than or equal to a minimum duration; and a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, each second time segment of the second time segments having a starting point of time; wherein the transmitting of the radio frequency signals is performed such that: a minimum fraction of the starting points of time is adjacent to the end of the first time segment and in an earliest scheduling time slot or in an earliest but one scheduling time slot of a transmission period of the transmission periods.

The transmitter may comprise means, the means comprising at least one processor; and at least one memory including computer program code, the at least one memory and computer program code configured to, with the at least one processor, perform the method.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
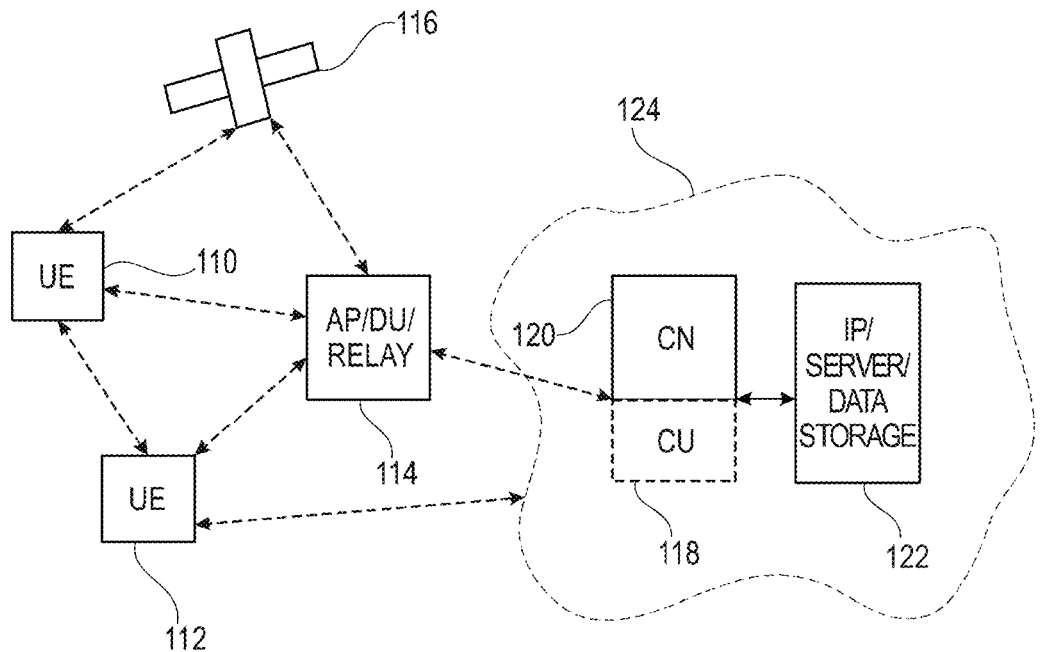
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail. Also, combinations of elements from different examples are part of the present subject matter.

A wireless communication system may be provided. The wireless communication system comprises nodes such as base stations, wherein each node may serve user equipments (UEs) located within the node's geographical area of service. The wireless communication system may support one or more radio access technologies (RATs). A radio access technology of the radio access technologies may, for example, be evolved universal terrestrial radio access (E-UTRA, a.k.a. LTE), 5G new radio (NR), or a future 6G based system, but it is not limited to, as a person skilled in the art may apply the present subject matter to other wireless communication systems provided with necessary properties.

The wireless communication system may be provided with a pattern for enabling communication within the wireless communication system. The pattern may be a schedule of times and frequencies for transmissions of data by the transmitter and for receptions of data by the transmitter. The pattern may comprise transmission periods. The transmission periods may be intervals of time during which a signal is transmitted. Between a transmission period and the following transmission period, there may be one transmission interruption period. There may be alternatingly transmission periods and transmission interruption periods. Transmission periods may not contain any transmission interruption period, but begin at the end of a transmission interruption period and end at the beginning of the following transmission interruption period. For example, the transmitter may be configured to transmit data during transmission periods of the pattern. During each transmission period of transmission periods of the pattern, the transmitter may transmit a signal which may include data using a wireless communication protocol. The specific wireless communication protocol may vary depending on the supported radio access technology of the wireless communication system.

In one example implementation of the pattern, the pattern may be controlled by a component of the wireless communication system. The component may, for example, be referred to as a scheduler. The scheduler may, for example, be part of the transmitter. The scheduler may be configured for determining the duration and timing of the transmission periods of the pattern. For example, the scheduler may be configured to predefine the pattern, e.g., with transmission periods of fixed duration. This predefined pattern may allow for easier planning and deployment of resources. For example, with a fixed pattern, time resources and frequency resources may be allocated in a consistent and predictable manner. This can help in optimizing network performance and ensuring reliable communication. In addition, a predetermined allocation of time and frequency resources may help in managing interference effectively. Alternatively, or additionally, the scheduler may dynamically adapt the pattern. For example, the scheduler may dynamically define and/or adjust duration of the transmission periods. This adaptation may, for example, be performed based on network conditions and traffic in the wireless communication system. This may enable a flexibility in configuring the resources based on changing network conditions and traffic demands. This may allow for energy saving, efficient utilization of resources and improved performance. This may also provide the flexibility to accommodate new technologies and services as they emerge.

In one example implementation of the pattern, the pattern may specify the number of scheduling time slots in each transmission period of the pattern. Each scheduling time slot may represent a specific time interval within the transmission period. Each transmission period of the transmission periods may comprise one or more scheduling time slots, wherein the (combined) duration of the one or more scheduling time slots is equal to the duration of the transmission period. For example, each transmission period of the transmission periods may be divided or split into one or more scheduling time slots. A scheduling time slot may be the shortest time unit for scheduling user data in the transmitter's data transmission. A scheduling timeslot may correspond to the time offset between subsequent points in time at which user data can begin being transmitted.

In case the wireless communication protocol uses the Orthogonal frequency division multiplexing (OFDM) modulation technique, the scheduling time slot may represent the time duration of an OFDM burst which may consist of consecutive OFDM symbols.

In one example implementation of the pattern, the number of scheduling time slots within the transmission period may be adjusted based on the specific requirements of the network. This may allow for efficient utilization of resources and better support for varying traffic loads. In one example, each transmission period of a subset of the transmission periods of the pattern may be split into multiple scheduling time slots, and in the remaining subset of the transmission periods of the pattern, each transmission period may comprise one scheduling time slot. Alternatively, each transmission period of the transmission periods of the pattern may be split into multiple scheduling time slots. Dividing the transmission period into scheduling time slots may allow for efficient allocation of resources. Each scheduling time slot may represent a specific time interval within the transmission period, and resources such as frequency bands and time-frequency resources may be allocated to each scheduling time slot. This may, for example, enable multiple users to share the transmission period effectively. This slot-based division may provide flexibility in adapting to changing network conditions and traffic demands.

In one example implementation of the pattern, each scheduling time slot of each transmission period of the pattern may have the same duration. Alternatively, the scheduling time slots of each transmission period may comprise multiple subsets, wherein each subset may have a distinct duration of its scheduling time slots. The scheduling time slot duration may vary depending on the specific use case, transmission parameters (such as the symbol duration and/or subcarrier spacing in an OFDM modulation technique) and requirements. For example, the scheduling time slot may be reduced below one millisecond to support ultra-reliable low latency communication (URLLC) services. The present subject matter may control the duration of the scheduling time slots using a threshold. For example, each scheduling time slot of the transmission periods may have a duration which is smaller than or equal to a duration threshold. The duration threshold may, for example, be provided as a configurable parameter of the transmitter.

The transmitter according to the present subject matter may enable transmission of data of an application using the pattern. The application may be a computer program configured to carry out a specific service or task. The service may be used by a user. The service may, for example, provide data to the user and/or provide processing resources for execution of tasks by the user. The execution of the application may be performed using multiple components which may be located in different geographical locations. The function of each these components may depend on the application's task. For example, the application may be a centralized application which may be executed on a single component and provide the service at a user's device. Alternatively, the application may be a distributed application, wherein the parts of the application may be distributed across multiple components. In both cases, the components for executing the application may include at least an application server, a user equipment and the transmitter according to the present subject matter. The application server may not be part of the transmitter. The application server may communicate with the user equipment and provide the data of the application. The transmitter may enable the transmission of data between the application server and the user equipment. The application server and the user equipment may communicate with each other through the transmitter for exchanging data and coordinating their actions to provide the desired service.

The application may have one or more application requirements. The application requirements may vary depending on the intended service of the application. For example, the application requirement may comprise a latency requirement. The latency may refer to the delay between the arrival of data at a sender and its reception at the receiver. The latency may, for example, be the time it takes for a data packet to travel from the sender's input to the receiver's output. The latency requirement may require low latency. The low latency may refer to a maximum delay experienced during data transmission. For example, the latency requirement may require a certain maximum latency for data transmission. The application may thus be referred to as a low-latency application. The low-latency application may require low latency for a good user experience and to support customer satisfaction. The low-latency application may, for example, include an extended reality (XR) application, gaming application or a mission-critical computation application. In this scenario, the low-latency requirement may ensure that a video stream reaches the user equipment with minimal delay for providing a seamless and real-time viewing experience to the user. Without low-latency transmission, there may be noticeable delays between the actual event and its representation on the user equipment, resulting in a poor user experience.

The execution of the low-latency application may comprise the transmission of data using the transmitter. For example, one or more instructions of the low-latency application may require the transmission of said data to the user equipment through the transmitter, that is, the transmitter receives the data from the application server and sends it to the user equipment. The data may comprise a set of datasets. For example, the set of datasets may be a sequence of datasets. That is, datasets in the set datasets are arranged in a specific order or sequence.

Each dataset of the set of datasets may comprise a collection of data units. The data unit may, for example, be one or more bits or a packet. The data units in each dataset of the set of datasets may be organized and structured in a specific way. For example, the data units of each dataset of the set of datasets may be ordered in time. The data units of each dataset of the set of datasets may be ordered chronologically. For that, each data unit of the dataset may be assigned a specific time (e.g., timestamp) and/or a sequence number that indicates its position in time with respect to the other data units. The timestamps and/or sequence numbers may be used to process the data units in the correct order. This ordering may, for example, be advantageous for providing videos or time series data. In one example, the set of datasets may be streamed by the application server to the transmitter (e.g., using a real-time streaming protocol) according to the order of the datasets and the order of the data units in each dataset.

The present subject matter may enable subsetting of each dataset of the sequence of datasets into two successive smaller subsets. That is, each dataset of the sequence of datasets may comprise a succession of a first sub-dataset and a second sub-dataset. The subsetting may, for example, be performed based on a criterion which may be referred to as sampling criterion. The subsetting may, for example, be performed dynamically based on the sampling criterion at runtime e.g., while data is being received by the transmitter. In another example, the subsetting may be static for providing fixed subsets that may remain unchanged over time. The subsetting may be performed such that each resulting subset comprises entire data units. For example, the sampling criterion may require that the rate at which the second sub-dataset is received at the transmitter is much higher than the rate at which the first sub-dataset is received at the transmitter e.g., the sampling criterion may require a large rise in traffic to convey the second sub-dataset. In another example, the sampling criterion may require that the first sub-dataset and the second sub-dataset are assigned different transmission resources. Dividing the dataset based on specific sampling criteria like rate may allow for efficient resource allocation. By allocating resources based on the characteristics of each subset, computational resources may be optimized to handle the specific requirements of each subset. This can result in lower power consumption, better resource utilization and improved overall system efficiency. This may also provide flexibility in managing and manipulating datasets. It may allow for selective processing, filtering, or transformation of specific subsets of data, without affecting the entire dataset. This flexibility can be valuable when dealing with complex data structures or when different subsets of data may require different processing approaches.

The transmitter may be configured to receive the sequence of datasets. The transmitter may be configured to receive the sequence of datasets from the application server.

In one reception example, the transmitter may receive the sequence of datasets by retrieving the datasets from the application server. The retrieval of data may be performed by, for example, querying the application server using specific criteria or conditions to fetch the desired data.

In one reception example, the transmitter may be configured to receive the sequence of datasets according to a communication protocol that is used by the application server to transmit data. The transmitter may receive the sequence of datasets from the application server through one or more networks, wherein the one or more networks may comprise a local area network (LAN), a radio access network (RAN), a metropolitan area network (MAN), a wide area network (WAN), Worldwide Interoperability for Microwave Access (WIMAX), a wireless local area network (WLAN), all or a portion of the Internet, any other communication system or a combination thereof.

The transmitter may be configured to provide the sequence of datasets. For example, the transmitter may be configured to provide to the user equipment the sequence of datasets. For that, the transmitter may be configured for transmitting radio frequency signals in an order of the sequence of the datasets. For example, the transmitter may be configured for successively transmitting the radio frequency signals in the order of the sequence of the datasets. Each radio frequency signal of the radio frequency signals comprises a dataset of the sequence of datasets. The number of radio frequency signals is equal to the number of datasets. For example, if the sequence of datasets comprises N datasets which are ordered in accordance with increasing order of integers from 1 to N: set1→set2→set3, . . . ,→setN, the transmitter may successively send N radio frequency signals, RFS1 . . . RFSN, where RFSi comprises dataset seti, i being an index having value between 1 and N. The transmission may be performed such that the transmission of RFS1 is followed by the transmission RFS2, and the transmission of RFS2 is followed by the submission of RFS3 and so forth. "the radio frequency signal comprises the dataset" may mean that the radio frequency signal is modulated by varying the properties of the radio frequency signal such as amplitude, frequency, and/or phase, to encode the dataset. The transmitter may comprise an antenna system for transmission of the radio frequency signals. The antenna system may comprise one or more antennas.

The transmission of each radio frequency signal by the transmitter may be interrupted during transmission interruption periods. The radio frequency signal is said to cover a radio frequency time interval. The radio frequency time interval has a duration equal to the duration of the radio frequency signal, wherein the duration of the radio frequency signal may be the sum of the duration of time at which the radio frequency signal is transmitted and the duration of the transmission interruption periods.

Each radio frequency signal of the radio frequency signals comprises a first time-domain signal part. The first time-domain signal part comprises at least part of the first sub-dataset of the dataset. The first time-domain signal part covers a first time segment and has an occupied bandwidth that is smaller than or equal to a first bandwidth threshold. The first time segment comprises one or more transmission interruption periods, wherein each transmission interruption period has a duration smaller than a certain interruption duration which is compliant with the latency requirement of the low-latency application. That is, the one or more transmission interruption periods are defined such that the latency of transmission of the radio frequency signal fulfils the low-latency requirement of the low-latency application. The first time segment has a duration higher than or equal to a minimum duration. The duration of the first time segment is set to be higher than or equal to the minimum duration, to ensure that, for a sufficiently long period of time, the occupied bandwidth does not exceed the first bandwidth threshold. This may allow for reducing the transmitter's power consumption during the first time segment.

Each radio frequency signal of the radio frequency signals comprises a second time-domain signal part. The second time-domain signal part comprises at least part of the second sub-dataset of the dataset. The second time-domain signal part covers a second time segment and has an occupied bandwidth that is higher than or equal to a second bandwidth threshold. The second bandwidth threshold is higher than the first bandwidth threshold. The end of the first time segment is adjacent to the beginning of the second time segment. Each second time segment of the second time segments has a starting point of time at its beginning.

Thus, the radio frequency time interval of each radio frequency signal includes the first time segment, the second time segment and one or more transmission interruption periods. The transmission interruption periods may be at the beginning and/or the end of the radio frequency time interval.

The present subject matter may enable a flexible encoding of radio frequency signals. For example, the first sub-dataset may comprise L data units and the second sub-dataset may comprise M data units. According to one example, the first time-domain signal part comprises (at least the initial transmissions of) the L data units of the first sub-dataset of the dataset and the second time-domain signal part comprises the M data units of the second sub-dataset of the dataset. Alternatively, the first time-domain signal part comprises L data units of the first sub-dataset and (at least the initial transmissions of) the earliest J data units of the second sub-dataset and the second time-domain signal part comprises the remaining M-J data units of second sub-dataset. Alternatively, the first time-domain signal part comprises L data units of the first sub-dataset and (at least the initial transmissions of) the earliest J data units of the second sub-dataset and the second time-domain signal part comprises (at least the initial transmissions of) an earliest portion of the remaining M-J data units of the second sub-dataset, wherein the remaining last portion of the remaining M-J data units of the second sub-dataset may be comprised in a third time-domain signal part of the radio frequency signal using its respective occupied bandwidth. The bandwidth may vary during the third time-domain signal part, and it may drop below the second bandwidth threshold. Alternatively, an earliest portion of (at least the initial transmissions of) the L data units may be comprised in an initial time-domain signal part of the radio frequency signal, the first time-domain signal part comprises the remaining portion of the L data units of the first sub-dataset and (at least the initial transmissions of) the earliest J data units of the second sub-dataset and the second time-domain signal part comprises (at least the initial transmissions of) an earliest portion of the remaining M-J data units of the second sub-dataset, wherein the remaining last portion of the remaining M-J data units of the second sub-dataset may be comprised in a third time-domain signal part of the radio frequency signal using its respective occupied bandwidth. The bandwidth may vary during the third time-domain signal part, and it may drop below the second bandwidth threshold.

The occupied bandwidth may be defined per scheduling time slot. It may be a time-average over a scheduling time slot of the sum of the widths of occupied frequency intervals where signal components that contain information for at least one receiver are transmitted, thus excluding the bandwidths of gaps and unwanted transmissions/emissions. (In mobile communications, examples of such occupied frequency intervals may be radio resources—e.g. subcarriers—for synchronization, reference signals, broadcast information, signaling, and/or data transmission.) The bandwidth conditions for the occupied bandwidth may apply to all scheduling time slots of the first and second time-domain signal parts, respectively. During the first time-domain signal part, the scheduling time slots may have an occupied bandwidth that is smaller than or equal to the first bandwidth threshold. During the second time-domain signal part, the scheduling time slots may have an occupied bandwidth that is higher than or equal to the second bandwidth threshold.

The transmitter may be configured to transmit the radio frequency signals in a way that maximizes the utilization of certain scheduling time slots. For example, the transmitter may transmit the radio frequency signals such that a minimum fraction of the starting points of time is in an earliest scheduling time slot or in an earliest but one scheduling time slot of a transmission period of the transmission periods. For example, to ensure efficient transmission, the radio frequency signals may be transmitted in such a way that the fraction of the starting points of time which fall at the beginning of an earliest scheduling time slot or at the beginning of an earliest but one scheduling time slot of a transmission period of the transmission periods is at least the minimum fraction. This transmission of the radio frequency signals in accordance with the minimum fraction may be referred to as "scheduling time slot based transmission".

The earliest scheduling time slot of the transmission period may be the first scheduling time slot and the earliest but one scheduling time slot of the transmission period may be the second scheduling time slot. An earliest but one scheduling time slot is the second earliest scheduling time slot. During the first time segment's last transmission interruption period, the transmitter may adjust and/or reconfigure internal parameters, e.g. a power amplifier's supply or drain voltage, to prepare for using a higher occupied bandwidth, modulation order and/or output power than during the first time segment.

Thus, the transmitter is configured to transmit the radio frequency signals in a way that maximizes the utilization of the earliest scheduling time slots. These earliest scheduling time slots are part of the transmission periods, and by ensuring that a minimum fraction of the starting points of time falls within these slots, the transmitter may optimize the efficiency of the transmission process.

In one example implementation of the scheduling time slot based transmission, the transmitter may need, in the case of a long first time-domain signal part, a transmission interruption period to prepare for using an occupied bandwidth that is higher than or equal to a second bandwidth threshold and/or to increase the predominant modulation order. Thus, during the first time segment's last transmission interruption period, the transmitter may get ready to use in the next scheduling time slot (i.e. the first scheduling time slot of the following transmission period) an occupied bandwidth that is higher than or equal to a second bandwidth threshold and/or to increase the predominant modulation order. In this case, the starting point of time may be in the first scheduling time slot.

In one example implementation of the scheduling time slot based transmission, the transmitter may adjust and/or reconfigure internal parameters during the first time segment's last transmission interruption period. (The purpose may be to prepare using an occupied bandwidth that is higher than or equal to a second bandwidth threshold and/or increasing the predominant modulation order.) After this change, a check and, if needed, adaptation of gain and/or predistortion parameters may be desirable before a major increase of the occupied bandwidth and/or the modulation order. The transmitter may check and, if needed, adapt parameters, e.g. for the gain and/or the predistortion, during the scheduling period following the first time segment's last transmission interruption period. Afterwards (i.e. in time for the second scheduling time slot of the transmission period following the first time segment's last transmission interruption period), the transmitter may be ready to use an occupied bandwidth that is higher than or equal to a second bandwidth threshold and/or to increase the predominant modulation order. In this case, the starting point of time may be in the second scheduling time slot.

These examples demonstrate how preparations, reconfigurations and/or adjustments of transmitter internal parameters during the first time segments' last transmission interruption periods allow for starting the second time domain signal parts in the following transmission periods' first and/or second scheduling time slots, ensuring that the minimum fraction requirement is met.

The subsetting of the datasets and the transmission of the associated radio frequency signals according to the sub-datasets may advantageously be used in different contexts. For example, in case the low-latency application is an XR application, wherein after a certain period of time of low user activity, the activity may increase due to the real time rendering and streaming of high-resolution graphic, 3D models and immersive audiovisual content. This may cause the XR application to generate additional traffic. Thus, the provision of data of the XR application may require two different rate levels. In another example, in case of a wireless communication in a factory setting, the first time-domain signal part may contain control information related to the operation of machinery, such as commands for robotic arms. The low-latency requirement may ensure that this information is transmitted with minimal delay to ensure smooth and timely operation of the machinery. The second time-domain signal part may contain data, such as software updates or monitoring information. The higher occupied bandwidth of the second time-domain signal part may allow for the efficient transmission of larger data sets, such as software patches or system logs. In another example, the first time-domain signal part may be used for transmitting emergency signals or priority messages in a public safety communication system. The low-latency requirement may ensure that these messages are transmitted promptly to ensure the safety and well-being of individuals in emergency situations. And, the second time-domain signal part may be utilized for transmitting communications, such as general announcements. The higher occupied bandwidth of the second time-domain signal part may allow for the efficient transmission of larger data sets, such as multimedia files or software updates.

For example, the transmitter may start receiving each second sub-dataset of the second sub-datasets at a specific point of time. This point of time is referred to as the arrival time. For example, the arrival time of the second sub-dataset may be the time at which the earliest data unit of the second sub-dataset is received at the transmitter.

The present subject matter may perform the method using specific arrangement of the arrival times.

For example, the arrival times may be uniformly distributed within a certain period of time. Each arrival time, among the plurality of arrival times, may be associated with a probability density. The probability density of each arrival time is constant or equal over the certain period of time. (If only discrete arrival times are possible, the possible discrete arrival times may have approximately a uniform spacing and equal probability—except for the outermost possible discrete arrival times which may have a lower probability—summing up to 1 over the certain period of time.) This certain period of time is characterized by a duration that is higher than or equal to the minimum duration. Specifically, the arrival time for each second sub-dataset is associated with a probability density indicating the likelihood of the second sub-dataset arriving at a particular time. The probability density of each arrival time is equal over the certain period of time. This may mean that the likelihood of a second sub-dataset arriving at any given time within this certain period of time is the same. The arrival time may be randomly equally distributed over the certain period of time. The certain period of time may or may not be the same for two different second sub-datasets.

For example, the transmitter may receive a set of second sub-datasets, each associated with a different arrival time probability density. The arrival time probability density for the second sub-dataset sub2_1 indicates that it is equally likely to arrive at any time within a 10-millisecond period. Similarly, the arrival time probability density for the second sub-dataset sub2_2 indicates that it is equally likely to arrive at any time within a 15-millisecond period. In this scenario, the transmitter may receive the second sub-dataset sub2_1 at a randomly determined time within the 10-millisecond period, and the second sub-dataset sub2_2 at a randomly determined time within the 15-millisecond period. The equal probability density may ensure that the arrival times are distributed evenly within their respective periods, allowing for a fair and balanced reception of the second sub-datasets.

In one example, alternative approaches may be used to implement the arrival time probability density. For example, instead of equal probability density over a fixed period of time, the probability density could be dynamically adjusted based on various factors such as network congestion or priority levels assigned to different sub-datasets. This flexibility may allow for customization and optimization of the reception process based on specific requirements or conditions.

In one example, the application server may provide to the transmitter the first sub-dataset of a dataset at a rate smaller than a first data rate and provide the second sub-dataset of that dataset at a rate that is higher than a second data rate. The second data rate is higher than the first data rate. In one example, the transmitter may or may not provide the data at the same rate by which the data is received e.g., from the application server. This may depend on the available resources. For example, the transmitter may dynamically adjust the rates at which the first and second sub-datasets are provided based on the current network conditions.

The provision of each first sub-dataset occurs at a rate that is smaller than the first data rate. This may allow for the transmission of the first time-domain signal part which covers the first time segment and has the occupied bandwidth that is smaller than or equal to the first bandwidth threshold. The first data rate may be high enough to prevent, in combination with the latency requirement, transmission interruption periods longer than the certain interruption duration.

The provision of each second sub-dataset occurs at a rate that is higher than the second data rate. This may enable the transmission of the second time-domain signal part, which covers the second time segment and has the occupied bandwidth that is higher than or equal to the second bandwidth threshold.

For example, the first sub-dataset may represent control information for a low-latency application, such as real-time remote control of a robotic system. The first time-domain signal part, with its smaller occupied bandwidth and short transmission interruption period, may allow for the timely delivery of the control information while meeting the latency requirement. The second sub-dataset, on the other hand, may represent high-bandwidth data, such as video or audio streams. By providing this data at a higher rate using a larger occupied bandwidth, the transmitter may ensure the efficient transmission of the high-bandwidth content.

According to one example, the first time segment that is covered by the first time-domain signal part ends with a transmission interruption period that belongs to the first time segment. The duration of each transmission interruption period is smaller than a certain interruption duration which may ensure compliance with the latency requirement.

For example, each term of the terms: "the first time segment", "the first time-domain signal part", "the second time-domain signal part", "the event", "the arrival time", "the earliest scheduling time slot" and "the transmission interruption period", may refer to the term in the respective multitude.

For example, if the transmitter is used in a wireless communication system for real-time video streaming, the first time segment of the radio frequency signal, which comprises at least part of the first sub-dataset of the dataset, covers a specific duration of time. Towards the end of this first time segment, a transmission interruption period is introduced. This transmission interruption period may carefully be designed to be shorter than the certain interruption duration, which is determined based on the latency requirement of the video streaming application. During this transmission interruption period, the transmission of the radio frequency signal may be temporarily paused. Once the transmission interruption period ends, the transmission may resume with the second time segment of the radio frequency signal, which comprises at least part of the second sub-dataset of the dataset.

By incorporating these transmission interruption periods within the first time segment, the transmitter can effectively manage the latency of the low-latency application. The duration of the first time segment is set to be higher than or equal to a minimum duration which may require a sufficiently long duration of providing the first sub-dataset to the transmitter. There may be just one transmission interruption period in the first time-domain signal part, and this transmission interruption period may be at the end of the first time-domain signal part.

Additionally, alternative examples may be considered to further optimize the transmission process. For instance, instead of having a single transmission interruption period within the first time segment, multiple short transmission interruption periods can be introduced. This can help distribute the processing or buffering of data, in particular in half-duplex operation, more evenly throughout the transmission, reducing the impact on latency.

According to one example, the first time-domain signal part may comprise the first sub-dataset and a first portion of the second sub-dataset. The second time-domain signal part may comprise at least part of a remaining second portion of the second sub-dataset. Furthermore, the second data rate is higher than the first data rate. For example, if the first sub-dataset comprises 100 data units and the second sub-dataset comprises 60 data units, the first time-domain signal part may comprise the 100 data units of the first sub-dataset and the first ordered 10 data units of the second sub-dataset. The second time-domain signal part may comprise the subsequent 30 data units of the second sub-dataset, and the remaining last 20 data units of the second sub-dataset may be sent by the transmitter using a third time-domain signal part of the radio frequency signal e.g., using a different occupied bandwidth. This may enable efficient utilization of available resources while fulfilling the latency requirement. Alternatively, the second time-domain signal part may comprise the remaining 50 data units of the second sub-dataset. In case of retransmissions of at least part of a dataset by the transmitter, a data unit of the at least part of the dataset may be transmitted by the transmitter in more than one time-domain signal part of the radio frequency signal.

For example, in a scenario where the first sub-dataset represents audio data and the second sub-dataset represents video data, the first time-domain signal part combines the audio data with a small portion of the video data, ensuring that the audio and video data is transmitted within the first time segment with low latency. The second time-domain signal part may then transmit the remaining video data within the second time segment, utilizing a higher bandwidth than during the first time segment to maintain the desired video quality. By optimizing the scheduling of the transmission, the transmitter may ensure efficient utilization of available resources and minimize any potential disruptions or delays in the transmission process.

According to one example, a signal fragment of the first time-domain signal part may comprise the first portion of the second sub-dataset. Following the above example, the signal fragment may comprise the first ordered 10 data units of the second sub-dataset. The duration of this signal fragment may be smaller than or equal to one transmission period. The signal fragment may end at the conclusion of this one transmission period.

For example, since the first time-domain signal part requires a lower data rate for transmission of the first sub-dataset due to its limited occupied bandwidth, and the second sub-dataset is provided at a higher data rate than the first sub-dataset, the transmitter may adjust the occupied bandwidth (and thus the data rate) of the signal fragment, ensuring that it still does not exceed the first bandwidth threshold. This adjustment may be made by transmitting the first portion of the second sub-dataset at a higher data rate than the first sub-dataset. This adjustment may ensure that the signal fragment maintains a consistent level of data transmission despite the difference in occupied bandwidth requirements between the first and second time-domain signal parts.

According to one example, the absolute value of the difference between the first data rate and the second data rate is higher than a certain threshold. This may define the sampling criterion for subsetting the dataset. The certain threshold may correspond to the data rate needed to make the transmitter use half of the maximum bandwidth that the transmitter uses.

According to one example, the second time-domain signal part is created by the transmitter in response to an event. The event may be the arrival of the earliest data unit of the second sub-dataset at the transmitter. Alternatively, the event may be the reception of a request of increasing data rate to higher than the second data rate. The transmitter may detect the arrival of the second sub-dataset or a requested increase of the data rate e.g. by an increase of the frequency of data units that the transmitter receives or by an increase of the level in its data buffer. The request may be received by the transmitter from a receiver (e.g., the user equipment) of the low-latency application data or (at least indirectly) from the application server that provides the low-latency application data.

Thus, as the second sub-dataset becomes available, the transmitter may incorporate it as soon as possible into the radio frequency signal.

For example, in online gaming, the first time-domain signal part may comprise a live information about movement of players in a scene and the second time-domain signal part may comprise video data for a new scene. When the video data for the new scene becomes available, the transmitter may incorporate it into the radio frequency signal at the selected scheduling time slot, ensuring that the player receives the most current and relevant information.

For example, a user of an augmented reality/virtual reality application may decide to switch in the application from augmented reality to virtual reality. The user may send a request to the transmitter, indicating the desired data rate. In response to receiving the data units from the application server with a shorter time offset between subsequent data units than before, the transmitter may generate the second time-domain signal part with the corresponding data rate and incorporate it into the radio frequency signal. This may ensure that the user receives the requested virtually reality without noticeable delay.

According to one example, the event that triggered the creation of the second time-domain signal part has occurred at the beginning of a transmission period. This example may enable to use patterns according to different duplexing schemes such as Time Division Duplex (TDD).

For example, a minimum fraction of the starting points of time which follow the events occurring at the beginnings of transmission periods may be in the one or two earliest scheduling time slots of the respective next transmission period.

According to one example, the minimum fraction of the starting points of time is located in the first scheduling time slot. The transmitter may include a feature that ensures a minimum fraction of the starting points of time for the transmission falls in the earliest scheduling time slot. The earliest scheduling time slot is a predetermined time interval within the transmission period. By allocating a minimum fraction of the starting points of time to this slot, the transmitter can speed up the transmission of data at this specific time interval. Starting points of time may be at the beginning of scheduling time slots. Hence, starting points of time falling in the earliest scheduling time slot may mean starting points of time falling at the beginning of a transmission period.

For example, the transmission period may be divided into multiple scheduling time slots, each with a fixed duration. The first scheduling time slot is the earliest slot within the transmission period. The transmitter may ensure that a minimum fraction of the starting points of time falls in this first scheduling time slot. This may mean that a significant portion of the transmission will occur during this time interval.

To illustrate this further, if a transmission period of 5 milliseconds is divided into five equal scheduling time slots of 1 millisecond each, the transmitter may ensure that at least 50% of the starting points of time fall in the first scheduling time slot, which is the earliest slot. This may mean that, after the transmission interruption period, the transmitter is ready to use an occupied bandwidth that is higher than or equal to the second bandwidth threshold and/or to predominantly use at least a 16-ary modulation.

In an alternative example, the transmitter may allocate the minimum fraction of starting points of time to the earliest scheduling time slot and the earliest but one scheduling time slot. This may allow for an occasional check of transmitter parameters such as the gain during the earliest scheduling time slot before increasing the occupied bandwidth or the predominant modulation order in the earliest but one scheduling time slot. Such a check may be particularly useful after a significant reconfiguration of the transmitter during the preceding transmission interruption period.

For example, if the transmission period is divided into four equal scheduling time slots of 1 millisecond each, the transmitter may ensure that a minimum fraction of the starting points of time falls in any of the first and second scheduling time slots. A starting point of time falling in any of the first and second scheduling time slots may mean in this example that it is at the beginning of a transmission period or 1 millisecond later when the second scheduling timeslot begins.

The transmitter may be characterized by a specific arrangement of the starting points of time in the first and second scheduling time slots. Specifically, the minimum fraction of the starting points of time is such that it exceeds 50% of the total starting points of time. This means that more than half of the starting points of time are allocated either in the first scheduling time slot or the second scheduling time slot.

For example, an algorithm may allocate the starting points of time only exceptionally later in a transmission period than at the second scheduling time slot, ensuring that more than half of the starting points of time fall in the first or second scheduling time slot.

The minimum fraction may be the minimum relative frequency. The fraction of the starting points of time in the first and second scheduling time slots can only be assessed with a sufficient accuracy if the sequence of datasets comprises a sufficiently large number of datasets and/or the number of the starting points of time which fulfil the criterion is high enough. In one example with a considerably higher minimum fraction than 50%, having the advantage of a higher reproducibility, if the minimum fraction is 89%, transmitting a sequence of datasets comprising at least 100 datasets may suffice. In an example with only 50 datasets, having the advantage that shorter sequences of datasets are suitable, too, an appropriate minimum fraction may be 92%. In these examples, it is assumed that during any 5 ms time interval in a first time segment of the first time segments, at most two transmission interruption periods may begin, and the transmitter may be active for at least 2.5 ms.

According to one example, the minimum duration is 10 milliseconds or longer (e.g. 2 minutes), ensuring that the first time segments have a suitable duration. This minimum duration may also ensure a satisfactory randomization of the arrival times. The randomization may prevent that the arrival times are predominantly at the beginning of transmission periods or too late during transmission interruption periods for reacting comprehensively already during the ongoing transmission interruption period, potentially resulting frequently in a rather long delay between the arrival time and the second time-domain signal part which begins only after the following transmission interruption period.

According to one example, the first time segment has a duration that is at least 10 milliseconds. This may ensure that data is transmitted using an occupied bandwidth that is smaller than or equal to the first bandwidth threshold for a duration that is sufficiently long for the transmitter to adapt internal parameters (such as a power amplifier's supply or drain voltage) to the traffic load. This adaptation may e.g. improve the transmitter's energy efficiency.

According to one example, the duration threshold of each scheduling time slot of the transmission periods is set at one millisecond. By setting this threshold as an upper limit of the scheduling time slots' duration, sufficient flexibility for scheduling user data may be ensured without requiring unreasonably high scheduling effort. Furthermore, the transmitter may be able to optimize the timing and duration of each time segment within the radio frequency signals. Additionally, the specific duration threshold may allow for flexibility in the transmission interruption periods within the first time segment. These transmission interruption periods, which have a duration smaller than a certain interruption duration, can be strategically placed to minimize any potential disruptions in the transmission of the radio frequency signals.

According to one example, the certain interruption duration is smaller than or equal to 2.5 milliseconds. By ensuring that the interruption duration is smaller than or equal to 2.5 milliseconds, the transmitter may be able to minimize any delays in the transmission of the radio frequency signals. For example, the low-latency application may require real-time communication between two devices. The transmitter, with its interruption duration of at most 2.5 milliseconds, may ensure that any transmission interruption periods during the first time segment are kept to a minimum. This may mean that the latency is minimized so that it may enable real-time communication. Controlling the certain interruption duration may prevent the transmitter (e.g., base station transmitter) from going into a sleep mode.

It is important to note that the certain interruption duration of 2.5 milliseconds is just one example of how the transmitter can be configured. Alternative examples may have different interruption durations depending on the specific requirements of the low-latency application. For example, in a different scenario where the latency requirement is more relaxed, the interruption duration could be increased to allow for longer transmission interruption periods. If, in a TDD system, for the purpose of receiving by using the reverse link direction, the transmission is interrupted e.g. for 2.5 milliseconds, and, because of only little data traffic, the transmission may be interrupted e.g. by another millisecond, and if both interruptions may be adjacent, a certain interruption duration of 3.5 milliseconds may be suitable.

According to one example, the first bandwidth threshold is a first fraction of a maximum bandwidth that the transmitter uses, and the second bandwidth threshold is a second fraction of the maximum bandwidth. The maximum bandwidth that the transmitter uses may be the largest occupied bandwidth that is observed, e.g. during the transmission of the radio frequency signals. By defining the occupied bandwidth thresholds relative to a reference maximum bandwidth, this example may provide a consistent and universal way to measure and compare the occupied bandwidth of different signals or systems.

According to one example, the first fraction of the maximum bandwidth is either 50% or 60%. By setting the first bandwidth threshold well below the maximum bandwidth, the transmitter may be able during the first time-domain signal part to adapt internal parameters, e.g. related to the transmitter's power saving, to low or moderate traffic load.

In an example where the maximum bandwidth is 100 MHz, if the first fraction is set at 50%, the first bandwidth threshold would be 50 MHz. This may mean that the first time-domain signal part of each radio frequency signal would occupy a bandwidth of 50 MHz or less. Similarly, if the first fraction is set at 60%, the first bandwidth threshold would be 60 MHz. In this case, the first time-domain signal part of each radio frequency signal would have an occupied bandwidth of 60 MHz or less.

In addition to the first bandwidth threshold, the transmitter also includes a second bandwidth threshold. This second bandwidth threshold is set at a higher fraction of the maximum bandwidth than the first bandwidth threshold. The specific value of the second fraction can also be adjusted based on the desired bandwidth allocation. By setting the second bandwidth threshold at a higher fraction of the maximum bandwidth, the transmitter may ensure that the second time-domain signal part has a wider occupied bandwidth than the first time-domain signal part. This may keep the latency low in case the second sub-dataset is provided at a higher rate than the first dataset.

According to one example, the second fraction in the transmitter is 70%. Additionally, the first fraction in the transmitter is 50%. This second fraction may be high enough to transmit the second sub-dataset with very little delay and/or with a low level in the transmitter's data buffer.

Following the example of a maximum bandwidth of 100 MHz, if the first fraction is set at 50% and the second fraction is set at 70%, the second bandwidth threshold would be 70 MHz. This means that the second time-domain signal part of each radio frequency signal may have an occupied bandwidth of 70 MHz or more. Alternatively, if the first fraction is set at 60% and the second fraction is set at 80%, the second bandwidth threshold would be 80 MHz. In this case, the second time-domain signal part of each radio frequency signal may have an occupied bandwidth of 80 MHz or more.

These examples demonstrate the flexibility of the transmitter in adjusting the capacity of the first and second time-domain signal parts to meet specific requirements and optimize the transmission of data. The specific values of the fractions can be determined based on factors such as the available bandwidth, the rate and/or urgency of the data in each sub-dataset.

According to one example, the second fraction is higher than the first fraction and the difference between the second fraction and the first fraction is at least 25% of the maximum bandwidth.

To illustrate this further, if the maximum bandwidth is 100 MHZ, the first fraction could be set to 50% of the maximum bandwidth, which would be 50 MHz. The second fraction, on the other hand, would be set to a higher value, such as 75% of the maximum bandwidth, which would be 75 MHz. Therefore, the difference between the second fraction and the first fraction would be 25 MHz, which is at least 25% of the maximum bandwidth.

Alternative examples may be implemented to achieve similar results. For instance, instead of using a fixed percentage for the first and second fractions, a dynamic allocation scheme can be employed. This dynamic scheme could adjust the fractions based on real-time conditions, such as the network traffic load or the priority of different applications.

According to one example, the pattern is provided in accordance with a Time Division Duplex (TDD) technique, wherein, from a base station perspective, the transmission periods are downlink (DL) periods. The pattern further comprises reception periods which, from a base station perspective, are uplink (UL) periods. (In this context, reception refers to the wireless communication system's reverse link direction, not to receiving a sequence of datasets, e.g. from an application, for transmission over the air.) From a UE perspective, the transmission periods are uplink periods, reception periods of the pattern are downlink periods. Each transmission interruption period comprises a discontinuous transmission (DTX) period and/or a reception period. That is, from a base station perspective, "transmission interruption period=DTX period" or "transmission interruption period=DTX+UL period" (not limiting to a specific order of DTX and UL periods), or "transmission interruption period=UL period".

The transmission periods of a base station, also known as downlink periods in TDD, are scheduled to transmit the radio frequency signals. Conversely, the reception periods of a base station, known as uplink periods in TDD, are scheduled for receiving signals from other devices.

The transmitter may include a transmission interruption period, which can consist of a discontinuous transmission (DTX) period and/or a reception period. During the DTX period, the transmitter may temporarily suspend the transmission of radio frequency signals to save power or reduce interference. During the reception period, the transmitter may switch to a receiving mode to listen for incoming signals from other devices. This may allow the transmitter to perform tasks such as receiving acknowledgments or control signals from the receiving devices. The reception period may be understood in a wide sense: It may comprise a guard period at its beginning, e.g. to accommodate the propagation delays in both link directions between the transmitter and the other devices. The reception period may include a guard period also at its end, e.g. to give enough time for switching the transmitter's link direction from reception back to transmission.

To ensure efficient scheduling during the DL periods and/or to transmit the radio frequency signals with a good quality (e.g. in terms of error vector magnitude and/or unwanted emissions), the transmitter may aim to maximize the fraction of starting points of time that fall within the earliest scheduling time slot or the earliest but one scheduling time slot during the DL periods. By doing so, the transmitter can optimize the allocation of resources and keep the latency sufficiently low.

According to one example, the pattern is provided in accordance with a Frequency Division Duplex (FDD) technique, wherein, from a base station perspective, the transmission periods are downlink periods, and wherein the transmission interruption period comprises a discontinuous transmission (DTX) period. From a UE perspective, the transmission periods are uplink periods. During the transmission interruption period, the transmitter may temporarily suspend the transmission of radio frequency signals. This can provide an opportunity to adjust and/or reconfigure transmitter internal parameters, e.g. a power amplifier's supply or drain voltage, whose change during a transmission period might cause a problem. The transmission interruption period can also be useful in saving power or reducing interference in certain scenarios.

It should be noted that while the TDD and FDD techniques and DTX period are described as examples, other transmission techniques and transmission interruption periods can also be utilized in the transmitter depending on the specific requirements of the communication system.

According to one example, the transmitter serves as a base station for a user equipment. The transmitter is configured to transmit low-latency application data to the user equipment. In this case, the transmission periods are DL periods. The transmitter may be configured to establish a wireless connection with the user equipment, allowing for the transmission of data between the two devices.

According to one example, the transmitter may be a user equipment. The transmitter is configured to transmit low-latency application data to a receiver such as a base station. In this case, the transmission periods are UL periods.

As described above, the transmitter may transmit each dataset of the sequence of datasets in accordance with desired rates by adapting the occupied bandwidth in the radio frequency signal. The present subject matter may further improve the transmission of the dataset in accordance with desired rates by controlling both the occupied bandwidth and the modulation scheme being used to encode data units of the dataset in the radio frequency signal. For example, multiple modulation schemes such as QPSK, 16QAM, 64QAM, 256QAM and 1024QAM may be provided. Each modulation scheme of the modulation schemes may have a respective modulation order. The modulation order may refer to the number of distinct symbols (e.g. represented by constellations points in a constellation diagram) used to represent data in a modulation scheme. It may determine the number of bits that can be transmitted per symbol and affect the data rate. Higher modulation orders allow for more bits to be transmitted per symbol, which may increase the data rate. Indeed, each symbol represents multiple bits of information, so higher-order modulation schemes can transmit more data per symbol. For example, 64QAM can transmit 6 bits per symbol, while 256QAM can transmit 8 bits per symbol.

For example, the radio frequency signal may be provided so that the modulation order of the data transmission is increased from predominantly quaternary to predominantly at least 16-ary when there is an abrupt. The transmitter may be configured to transmit the radio frequency signal so that data of the first time-domain signal part is encoded with a first modulation scheme having a first modulation order and data of the second time-domain signal part is encoded with the first modulation scheme at its beginning and with a second modulation scheme having a second modulation order, wherein the second modulation order is higher than the first modulation order.

In one alternative example, the scheduling time slot based transmission may be implemented using a method (named "amplification method") and/or an apparatus (named "amplification apparatus") which includes a power amplifier. The amplification apparatus may, for example, be part of the transmitter. Various alternatives for the amplification apparatus and the amplification method may be implemented. For instance, the amplification apparatus may be used in other wireless communication systems such as Wi-Fi networks or satellite communication systems.

The amplification apparatus and the amplification method may be described as follows. The amplification method may be performed by the amplification apparatus or by another means.

Amplification Apparatus

The amplification apparatus may comprise at least one scheduler. The scheduler may decide adaptively which radio resources in frequency, time and space as well as which modulation and coding scheme (MCS) may be applied to transmit data to one or more user equipments. At least one of the one or more schedulers of the amplification apparatus may define or schedule a pattern of transmission and reception periods. The pattern may, for example, comprise time periods for transmission of data to the one or more user equipments and time periods for transmission of data by the one or more user equipments.

For example, at a current point of time, the amplification apparatus may determine that data (DATA) may need to be transmitted by the amplification apparatus in an upcoming transmission period (UTD). The upcoming transmission period UTD may, for example, be identified by the amplification apparatus using the current point of time and the pattern. The upcoming transmission period UTD may be the transmission period of the pattern which immediately follows the current point of time.

Before the upcoming transmission period UTD begins, the amplification apparatus may estimate a power property for transmission of the data DATA in the entire transmission period UTD. The power property may indicate a power for transmission of the data DATA. For example, the power property may be a peak power that is required for data transmission and accessed for the whole upcoming transmission period UTD.

Using the estimated power property, the amplification apparatus may determine a drain voltage value for the power amplifier. The drain voltage of the power amplifier may be adjusted according to the determined drain voltage value in order to enable the transmission of the data DATA with a sufficiently high signal quality and data rate.

Based on the determined drain voltage value, the amplification apparatus may adjust the drain voltage of the power amplifier of the amplification apparatus before the transmission period UTD begins or during the transmission period UTD. For that, the amplification apparatus may determine whether the adjustment of the power amplifier to the determined drain voltage value requires an increase or a reduction of a current drain voltage of the power amplifier.

In case a reduction of the drain voltage of the power amplifier is possible, the amplification apparatus may identify an existing transmission interruption period (of the pattern) or define a new transmission interruption period, wherein the transmission interruption period immediately precedes the upcoming transmission period UTD. The amplification apparatus may perform during the transmission interruption period a drain voltage reduction of the power amplifier to the determined drain voltage value.

In case an increase of the drain voltage of the power amplifier is required, the amplification apparatus may perform either during the transmission interruption period, if it exists, or during the transmission period UTD a drain voltage increase of the power amplifier to the determined drain voltage value. If the DV ramping takes a bit longer than a single transmission interruption period, it may be distributed across subsequent transmission interruption periods, which may limit the maximum achievable DV and hence the achievable data rates in the intermediate transmission periods.

For example, in case the amplification apparatus is used in a cellular network, the amplification apparatus may determine the power property for the transmission of data in the entire upcoming transmission period UTD, taking into account factors such as the distance between the transmitting and receiving devices, the signal strength, and the interference level. Based on this power property, the amplification apparatus may determine the appropriate drain voltage value for the power amplifier.

The present subject matter may improve the power amplifier efficiency and lower the power consumption. This may particularly be advantageous as a significant part of the provided DC power in a radio transmitter may be dissipated inside the power amplifier. The implementation of the amplification apparatus may have a minor hardware impact and still virtually not affect the signal quality.

In one example implementation, the amplification apparatus may comprise a Drain Voltage Modulation (DVM) controller and a radio unit that are configured to perform the above steps starting from the estimation of the power property to the change of the drain voltage of the power amplifier. The DVM controller may be near or inside the scheduler or may be a part of the scheduler. In one example, based on the data available for scheduling, the DVM controller may evaluate for the upcoming transmission period UTD a meaningful TX peak power limit (which optionally contains some headroom) and may force the scheduler to maintain this limit within the transmission period UTD. In addition, the DVM controller may inform the radio unit of about any TX peak power limit latest 1 ms (=DV ramping plus information processing) before the beginning of the transmission period UTD. The DVM controller may use methods for analyzing the traffic content (such as deep packet inspection) for forecasting the traffic load during the transmission period UTD. The content of packets may show where traffic ends, and the content of reception packets includes the UE's server requests which trigger new transmission traffic whose arrival can be expected after a short delay.

For example, the application of DV switching instead of DV ramping may allow changing the DV much faster (<1 μs), which is at sub-symbol level. Since the DV switching may also be much faster than the signal processing inside the radio unit, it may be sufficient to make the information for switching available at the beginning of the transmission period UTD (related to the radio unit input). This may be advantageous as there may be no issue with short UL periods or short DTX, since much less than a single symbol may be sufficient to hold the period of a switching event. The radio unit may trigger the ramping or switching towards the corresponding DV level before the associated transmission period UTD. In addition, the radio unit may scale the clipping threshold during the DV ramping or switching according to the PA's peak power capability being related to the targeted DV.

According to one example, the transmission interruption period is at least one of: a reception period or a discontinuous transmission (DTX) period. That is, "transmission interruption period=DTX" or "transmission interruption period=DTX+reception period" or "transmission interruption period=reception period".

According to one example, the amplification apparatus is configured for: allocating time-frequency resources in the transmission period UTD for transmission of the data and determining power boosting and signal quality requirements for the allocated time-frequency resources in accordance with the power property. The allocated time-frequency resources may be specifically designated for the transmission of the data. The power boosting and signal quality requirements are determined specifically for the time-frequency resources that have been allocated. This example may be implemented by the scheduler of the amplification apparatus.

In one example implementation, the DVM controller of the amplification apparatus may determine a desirable maximum signal peak power or a "pessimistic" estimate thereof for the whole transmission period UTD. In addition, the DVM controller informs the scheduler about the peak power as initially determined, for the scheduler's resource allocation, if the achievable peak power capability of the power amplifier in the UTD enables that peak power. Otherwise, the DVM controller may limit the initially determined peak power in accordance with the achievable peak power capability of the power amplifier in the UTD and inform the scheduler about the limited peak power. The scheduler may use that limited peak power to allocate resources. This may, for example, enable the scheduler to limit the traffic such that for no OFDM symbol with a certain mix of allocated resource blocks (RBs) with a potentially different power boosting and signal quality requirements, the peak power capability (e.g., including headroom) is exceeded. The DVM controller informs also the radio unit about the peak power so that the radio unit can determine the combined peak power limit and scales the clipping threshold accordingly. Even if the scheduler's resource allocation needs more peak power than available, the radio unit can limit the peak power as needed, but the signal quality may then be worse than targeted.

This example may enable adaptive power boosting and signal quality control. The scheduler may analyze the power property of the allocated time-frequency resources and determine the appropriate power boosting and signal quality requirements. This adaptive approach may allow the amplification apparatus to dynamically adjust the power levels and signal quality parameters to meet the specific needs of the allocated resources.

According to one example, the amplification apparatus is configured for estimating the power property using forecast information comprising at least one of: an expected load during the transmission period UTD or power boosting or signal quality requirements of resource blocks during the transmission period UTD.

In one example where the forecast information includes the expected load during the transmission period UTD, the amplification apparatus may analyze this information and determine the optimal power allocation for each resource block based on the expected load. By allocating more power to resource blocks with higher expected load, the amplification apparatus may ensure that sufficient power is allocated to meet the demand and maintain reliable communication.

Another aspect of the example involves power boosting. The forecast information may indicate certain scenarios where additional power is required to overcome signal degradation or interference. In such cases, the amplification apparatus adjusts the power allocation accordingly, allocating more power to resource blocks that require power boosting. In particular when the signal-to-interference-and-noise ratio (SINR) at the receiver is low, the power boosting may ensure that these resource blocks are received with a sufficiently low error rate.

Furthermore, the amplification apparatus takes into consideration the signal quality requirements of resource blocks during the transmission period UTD. The forecast information may provide insights into the expected signal quality requirements for different resource blocks. Based on this information, the amplification apparatus optimizes the power allocation to ensure that the signal quality requirements are met for each resource block. This can involve allocating more power to resource blocks that are received at a low SINR, while allocating less power to those with a high SINR.

The examples provided above are just a few possibilities of how the estimation of the power property can be implemented. The amplification apparatus can utilize various algorithms and techniques to determine the optimal power allocation based on the forecast information. Additionally, the forecast information itself can be obtained from different sources, such as historical data, real-time measurements, or predictive models.

According to one example, the amplification apparatus is configured for estimating the power property with a power headroom. The power headroom has a level depending on the forecast information. The power headroom may be provided to cover an unforeseeable increase of traffic within the upcoming transmission period UTD.

For example, the amplification apparatus may be a smartphone that requires a stable power supply to operate effectively. For instance, if the forecast information indicates that the user of the smartphone is likely to engage in power-intensive activities, such as gaming or video streaming, the power headroom will adjust the level accordingly to ensure that sufficient power resources are allocated to meet the device's demands.

In one example, while the power headroom estimation may be primarily dependent on the forecast information, the further example of the amplification apparatus may also incorporate real-time monitoring and feedback mechanisms to evaluate the power property. This dynamic approach may ensure that the power property estimation remains accurate and adaptable to changing conditions.

According to one example, the power property for data transmission during the upcoming transmission period UTD may be a combination of power properties of carriers or subsets of carriers which the power amplifier shall amplify during the upcoming transmission period UTD. In this example, the amplification apparatus may be configured with advanced means for estimating the power property. These means utilize various techniques and algorithms to analyze the power properties of carriers or subsets of carriers that will be amplified by the power amplifier during the upcoming transmission period UTD. By considering the power properties of specific carriers or subsets of carriers, the estimation process becomes more precise and tailored to the actual requirements of the transmission.

For example, the radio unit may sum up the peak power limits from the scheduler instances of all carriers and triggers the transition (e.g., by ramping or switching) towards the corresponding DV level before the associated transmission period UTD. In addition, the radio unit scales the clipping threshold during the DV ramping or switching according to the PA's peak power capability being related to the targeted DV.

In an alternative example, the amplification apparatus may incorporate machine learning algorithms to improve the accuracy of the power property estimation. By analyzing historical data and patterns, the amplification apparatus may learn and adapt to different transmission scenarios, further enhancing the estimation process. This allows the amplification apparatus to continuously improve its power allocation and utilization strategies, resulting in even better performance and efficiency.

According to one example, the combination of power properties may be the sum or the average of the power properties. By summing up these power properties, the amplification apparatus may generate a comprehensive estimation of the power property. By averaging the power properties, the amplification apparatus may provide a balanced and representative estimation of the power property which may be advantageous in certain scenarios.

In one example, the choice between summation and averaging may depend on the specific application and the desired level of accuracy. The amplification apparatus may be configured to switch between these modes based on user preferences or system requirements. Additionally, other combination methods, such as weighted averaging or weighted summation of the power properties, may also be implemented to further customize the estimation process.

According to one example, the amplification apparatus is configured for performing the drain voltage change by ramping, stepping or switching. The drain voltage change may be a reduction or an increase.

"Ramping" refers to gradually increasing or decreasing the drain voltage over a period of time. By gradually increasing or decreasing the drain voltage, the output power can be smoothly adjusted, allowing for precise control over the amplifier's performance.

"Stepping" refers to changing the drain voltage in discrete steps or increments. This stepping can be used to adjust the output voltage in small increments, allowing for fine-tuning of the regulated voltage. Changing the drain voltage in discrete steps can maintain a stable output voltage even in the presence of varying load conditions.

"Switching" refers to rapidly changing the drain voltage between two or more predefined levels.

In one example, the drain voltage may be changed by adjusting a lower or higher output voltage at a DC/DC converter or at an AC/DC converter of the amplification apparatus.

In one example, the drain voltage may be changed by switching between an output of a first power supply circuit and an output of a second power supply circuit of the amplification apparatus.

In one example, various alternatives and modifications can be implemented to enable the drain voltage change. For instance, the means for performing the increase or reduction of the drain voltage may be implemented using different types of voltage generators, converters, switches, or transistors, depending on the specific application and requirements.

According to one example, the determining of the power property comprises receiving the power property within a predefined time period before the beginning of the transmission period UTD. The predefined time period may be milliseconds or microseconds before the transmission period UTD begins. This may allow the amplification apparatus to accurately determine the appropriate voltage level for the operation. For example, the power property of the radio frequency signal during the future transmission period UTD may be provided well in advance (e.g. about 1 ms) to the radio unit and influences the DV adjustment.

According to one example, the amplification apparatus is configured for determining a drain voltage value by utilizing a table containing a relationship between drain voltage values and power properties. The amplification apparatus may receive input from the table containing the relationship between drain voltage values and power properties. The amplification apparatus may analyze the power properties and determine the appropriate drain voltage value. For example, if the power property indicates a higher power requirement, the amplification apparatus may increase the drain voltage value to ensure optimal performance. Conversely, if the power property indicates a lower power requirement, the amplification apparatus may decrease the drain voltage value to conserve energy.

In an alternative example, instead of utilizing a table, the amplification apparatus may employ a mathematical model or algorithm to determine the drain voltage value based on the power property. This mathematical model or algorithm may be programmed into the amplification apparatus and used to calculate the appropriate drain voltage value in real-time.

According to one example, the amplification apparatus is configured for using the power property to derive a corresponding threshold for a crest factor reduction of signals during the transmission period UTD. By continuously monitoring the power properties of the signals, the amplification apparatus may intelligently determine the optimal threshold value for each transmission, ensuring efficient crest factor reduction without compromising signal quality. In another example, the amplification apparatus may utilize advanced signal processing algorithms, such as peak clipping or peak windowing, to reduce the crest factor of the signals. These techniques may selectively limit the peak amplitudes of the signals, effectively reducing the peak-to-average power ratio and achieving crest factor reduction.

According to one example, the amplification apparatus may be configured to: in response to determining that the change (e.g., by increasing or decreasing) of the drain voltage of the power amplifier to the determined drain voltage value during the transmission interruption period UTD is not finished, the power property may be adapted according to the reached drain voltage of the power amplifier.

According to one example, the amplification apparatus may be configured to limit (or update or adapt) the determined power property based on the achievable peak power capability of the power amplifier in the UTD. For example, the desirable peak power that is estimated from forecast information may be limited in accordance with the PA's peak power capability achievable in the UTD. The drain voltage value may be determined based on the limited power property. For example, the limited power property (derived from the power property of the radio frequency signal during the future transmission period UTD) is determined so that the drain voltage change is not larger than enabled by the power amplifier and its power supply during the transmission interruption period.

According to one example, the transmission of the data DATA during the upcoming transmission period UTD may be performed by generating a radio frequency signal that comprises the data DATA. The radio frequency signal may be amplified using the power amplifier after changing the drain voltage of the power amplifier. In addition, resources may be allocated to the radio frequency signal may based on the estimated (or updated) power property.

The limitation or update of the power property may be advantageous for the following reasons. For example, a desirable maximum signal peak power may be evaluated for the whole upcoming transmission period UTD. A limit may be derived and used for three objects a), b) and c): a) for scheduling the traffic, the scheduler shall limit the traffic such that for no OFDM symbol with a certain mix of allocated RBs with a potentially different power boosting and signal quality requirements, the peak power capability (including headroom) is exceeded. b) for a DV which corresponds to the limit for the 3 objects, the peak power limit or a related quantity is signaled to the radio unit and is used to derive the corresponding DV, which is capable of providing a sufficiently high peak power capability. This can be done by utilizing a table containing the relationship between DV and PA's peak power capability for this PA or for this radio unit. If there are more than one scheduler instance, the peak power limits shall be added or combined before deriving the DV. c) for selecting the clipping threshold, the peak power limit or a related quantity is signaled to the radio unit and is used to derive the corresponding clipping threshold. Normally, the clipping threshold directly scales with the peak power capability, but a different relationship may be applied as well. If there is more than one scheduler instance, the peak power limits shall be added or combined before deriving the clipping threshold.

Since the low drain voltage (DV) may be applied for a whole upcoming transmission period UTD, a peak power limit may be evaluated, which is valid for the whole upcoming transmission period UTD. This can be based on traffic estimates, from which the required peak power is derived by applying a reasonable resource allocation mix with proper power boosting and signal quality requirements being applied. For example, the power boosting may be selected such that the received signal on the UE side is high enough related to noise and interference experienced by the UE, in order to allow a good detection of the utilized modulation and coding scheme (MCS). Also, the PAR of the signal may be sufficiently high for supporting a low enough transmitter EVM which may allow a reasonably good signal quality for the intended MCS on the transmitter side. Some headroom shall be provided to cover an unforeseeable increase of traffic within the upcoming DL period.

In one example, the transmission period UTD is a DL period, wherein the amplification apparatus is part of a base station. The base station serves one or more user equipments which receive the data DATA from the base station.

The amplification apparatus may comprise means, the means comprising at least one processor; and at least one memory including computer program code, the at least one memory and computer program code configured to, with the at least one processor, perform the method as described with reference to the amplification apparatus.

Drain voltage reductions or changes may be restricted by one or more of the following options, Option 1, Option 2, Option 3 and Option 4.

Option 1. To simplify the DPD's linearization effort, one may lower the number of drain voltage reductions and thus also changes by introducing a minimum step size for a system parameter, e.g. in terms of DV or power property, for reducing the DV. This means that the DV will not be reduced if the possible system parameter's change is below this step size (i.e., the change is not significant) and thus virtually doesn't provide power savings.

Option 2. One may stay at low DV, even after a requested traffic increase, and just prioritize the low-latency traffic. When due to traffic limitation the transmit buffer or packet latency exceeds a certain limit, a DV increase may be planned in the next transmission interruption period. To further reduce the frequency of DV changes by limiting also DV reductions, there may be a configurable period of time that immediately precedes the transmission interruption periods. The maximum of the determined (or estimated) power properties for the transmission periods in this configurable period of time before a UTD's end may be determined. If this maximum requires a DV that is higher than or equal to the current DV, the DV is not reduced. If this maximum allows for a lower DV, a value-referred to as 'limited value'—may be derived from this maximum which is limited in accordance with the PA's peak power capability that is achievable in the UTD. The DV may be determined in accordance with the limited value.

Option 3. One may allow for a few discrete DV levels being associated with corresponding peak power capabilities and forming a pre-defined set of fixed drain voltages, which reduces the number of needed linearization parameter sets for the DPD. In this case, the selected associated peak power capability must be at least the peak power limit determined for the UTD. In a simple example, just 3 DV levels may be sufficient as follows: a) Full DV, b) the lowest DV at which the PA provides linearizability, sufficiently high gain and efficiency and c) an intermediate drain voltage.

For switching between two adjacent discrete DV levels, it's recommended to apply a higher threshold for switching from the lower to the upper of these two discrete DV levels than for switching from the upper to the lower of these two discrete DV levels. This hysteresis may reduce the risk of toggling between two adjacent DV levels. For example, for switching between a DV of 30 V and 40 V, the apparatus may switch to 40 V if the DV value determined for an UTD is >30 V and switch back to 30 V if the DV value determined for an UTD is ≤29 V. In one example, the radio unit may communicate the few discrete peak power capabilities that correspond to the pre-defined set of fixed drain voltages to the one or more DVM controllers so that the DVM controllers may select one of the radio module's supported peak power capabilities as the peak power limit that they command to the radio unit and to the one or more schedulers. Since this selection corresponds to rounding up the peak power limit to a supported peak power capability, there is usually additional headroom for supporting more traffic than forecasted. This is because then also the one or more schedulers limit the traffic according to the radio module's supported few discrete peak power capabilities.

Option 4. It may be sufficient having a "pessimistic" estimate for the power property, which tends to result in slightly higher DV values than really necessary. This estimate simplifies determining the DV value. In many cases, it allows for serving higher data rates than those actually needed and thus reduces the delay of traffic in the case of a sudden traffic rise.

Amplification Method

According to an aspect of the present disclosure, there is provided a method (amplification method) for readjusting a drain voltage (DV) of a power amplifier (PA) during the transmitter's runtime. The readjustment is based on a peak power related property of a signal without constant envelope, which the PA is intended to amplify during an upcoming period of time. This period of time may correspond to an entire time interval when the signal is active. "signal is active" means that the signal is being transmitted. The signal without constant envelope may be a signal with a substantially constant envelope. The readjusting of the drain voltage (DV) of the power amplifier may, for example, mean that the DV has been adjusted before the amplification method starts. The peak power related property may be the peak power limit. The peak power related property may be the PA's peak power capability. By appropriate DV adjustment, the PA's peak power capability may match the peak power limit.

This method may ensure that the DV readjustment is carried out in a manner that is synchronized with the operational requirements of the PA. This may aim to optimize the performance and efficiency of the PA by synchronizing the DV readjustment with the operational requirements of the PA.

In the method, the DV is only changed or only decreased when the PA does not need to provide a radio frequency output signal before the upcoming period of time. This feature may ensure that the DV is adjusted in a manner that is optimized for the specific requirements of the electronic circuit's runtime. For example, this feature may simplify a digital predistortion's linearization of the PA's DV dependent characteristic.

In one example, if the DV change is initiated but remains incomplete during a period when the PA is not required to provide a radio frequency output signal, the DV change is halted. In such a scenario, the peak power related property is changed according to a reached DV.

For instance, if the DV change was initiated to increase the drain voltage value from 50% to 70% of the maximum DV, but during the specific period, the DV change is halted at 60%, the peak power related property may reflect the DV level of 60%. In one example, the PA is part of a transmitter. The PA serves to amplify a TX signal. Additionally, the upcoming period of time is identified as a future TX period.

In one example, the periods when the power amplifier (PA) need not provide a radio frequency output signal, i.e., does not need to amplify the transmission (TX) signal, comprise DTX periods. Additionally, the periods when the PA does not need to amplify the TX signal may also include periods in a time-division duplex (TDD) system. In such TDD systems, these periods occur when neither the link direction requiring transmission nor a calibration requiring the PA's amplification are active for the transmitter.

In one example, information about the expected traffic to be carried by the TX signal during the future TX period is assessed. Additionally, the peak power related property that the TX signal should have during the future TX period is determined. This determination may optionally include a headroom. The purpose of this assessment and determination is to ensure that the expected traffic can be served well (e.g. in terms of throughput, latency and/or signal quality).

In one example, information about the expected traffic to be carried by the TX signal during the future TX period is assessed. A margin may be applied to the expected traffic to accommodate estimation inaccuracies. Additionally, the peak power related property of the TX signal during the future TX period is determined. In the determination, the peak power related property of the TX signal during the future TX period may be limited to ensure that the DV change is not larger than what is possible during a period when the PA need not provide a radio frequency output the signal.

In one example, the scheduling of data and/or data rate, as well as the allowance of traffic in the TX direction during a future TX period, is dependent on a peak power related property. The peak power related property determines what data and/or data rate is scheduled or what/how much traffic is allowed in the TX direction during the future TX period.

In one example, the peak power related property of the TX signal during the future TX period is provided well in advance, for example, about 1 ms, to the transmitter. The provision of this information to the transmitter influences the transmitter's DV adjustment.

In one example, the peak power related property of the TX signal during the future TX period may refer to an aggregation. This aggregation comprises the peak power related properties of carriers or subsets of carriers. The PA, or power amplifier, shall amplify these carriers or subsets of carriers during the future TX period. The aggregation, in this context, can be understood as a combination of these peak power related properties.

In one example, the peak power related property of the TX signal during the future TX period may influence a setting of a digital limitation, e.g. a limitation of the TX signal amplitude. The digital limitation is associated with a peak power or peak level at the PA's input clipping embodiment. In this context, the peak power related property of the TX signal during the future TX period influences the specific setting of the digital limitation. The digital limitation may prevent that the PA's peak power capability is exceeded.

In one example, the peak power related property of the TX signal during the future TX period may influence a setting of a digital predistortion. In this scenario, the amplification apparatus comprises a digital predistortion. The digital predistortion is configured to adjust, e.g. during the transmission interruption period immediately preceding the future TX period, its setting based on the peak power related property of the TX signal during the future TX period. Since the new DV for the future TX period is a bijective function of the peak power related property during the future TX period, both are interchangeable in this context. The digital predistortion's setting, internal state and/or parameters may be adjusted also based on other input such as a feedback signal from an observation receiver which is useful for the digital predistortion's optimization of its linearization performance even at a constant DV. When the DV is changed, the digital predistortion may store its last setting of the ending DV and prepare for the new DV by adjusting its setting according to the new DV, e.g. according to an earlier setting stored at the same or a similar DV as the new DV or according to an interpolation between earlier settings at a higher and at a lower than the new DV.

In one example, the peak power related property of the TX signal during the future TX period is defined as the maximum TX peak power during the future TX period. In this configuration, the amplification apparatus may be designed to measure and analyze the TX signal during the future TX period. The analysis may result in the identification of the maximum TX peak power, which is then associated with the peak power related property of the TX signal.

In one example, in a transceiver for Time Division Duplex (TDD), the future transmission (TX) period commences subsequent to a subsequent reception (RX) period.

In one example, the increases in DV during the TX periods are limited in frequency and/or DV difference. The limitation is based on at least one criterion. The criterion reflects a minimum signal quality and/or a maximum level of unwanted emissions.

In one example, a control module may be configured to enforce the limitation on the increases in DV. The control module may also be configured to monitor the signal quality and/or the level of unwanted emissions.

In one example, after a DV increase during a TX period, the amplification apparatus may be configured such that DV decreases are prohibited or restricted for a predefined period of time. In this configuration, the amplification apparatus operates in a manner that prevents or limits any subsequent decrease in DV for the specified duration.

In one example, the DV may be changed by adjusting a lower or higher output voltage from a PA's power supply. This adjustment can occur at a DC/DC converter or at an AC/DC converter. In this configuration, the DV is not fixed but can be varied by manipulating the output voltage of the converter.

In one example, the DV is changed by switching between an output of a first power supply circuit and an output of a second power supply circuit. In this configuration, the amplification apparatus comprises a first power supply circuit and a second power supply circuit. The first power supply unit may provide a first output voltage and the second power supply circuit may provide a second output voltage which differs from the first output voltage. The DV is altered by switching between these outputs.

The present subject matter may comprise the following clauses.

Clause 1. An apparatus for data transmission in a wireless communication system using a pattern comprising transmission periods, the apparatus comprising means being configured for: determining a power property for transmission of data in an entire upcoming scheduled transmission period, the power property indicating a power for transmission of the data; determining a drain voltage value for a power amplifier of the apparatus using the power property; determining whether an adjustment of the power amplifier to the determined drain voltage value requires an increase or a reduction of a current drain voltage of the power amplifier; in case a reduction of the drain voltage is required, identifying a transmission interruption period, of the pattern, that precedes the upcoming transmission period; and performing during the identified transmission interruption period a drain voltage reduction of the power amplifier to the determined drain voltage value; in case an increase of the drain voltage is required, performing during the transmission interruption period or transmission period a drain voltage increase of the power amplifier to the determined drain voltage value.

Clause 2. The apparatus of clause 1, the transmission interruption period being at least one of: a reception period or a discontinuous transmission (DTX) period.

Clause 3. The apparatus of any of the preceding clauses 1 to 2, the means being configured for: allocating time-frequency resources in the transmission period for transmission of the data; determining power boosting and signal quality requirements for the allocated time-frequency resources in accordance with the power property.

Clause 4. The apparatus of any of the preceding clauses 1 to 3, the means being configured for: estimating the power property using forecast information comprising at least one of: an expected load during the transmission period or power boosting or signal quality requirements of resource blocks during the transmission period.

Clause 5. The apparatus of clause 4, the means being configured for estimating the power property with a power headroom, the power headroom having a level depending on the forecast information.

Clause 6. The apparatus of any of the preceding clauses 1 to 5, the power property being a combination of power properties of carriers or subsets of carriers which the power amplifier shall amplify during the future transmission period.

Clause 7. The apparatus of clause 6, the combination being the sum or the average.

Clause 8. The apparatus of any of the preceding clauses 1 to 7, the means being configured for performing the drain voltage increase or reduction by ramping, stepping or switching.

Clause 9. The apparatus of any of the preceding clauses 1 to 8, wherein the determining of the power property comprises receiving the power property within a predefined time period before the beginning of the transmission period.

Clause 10. The apparatus of any of the preceding clauses 1 to 9, the means being configured for determining a drain voltage value by utilizing a table containing a relationship between drain voltage values and power properties.

Clause 11. The apparatus of any of the preceding clauses 1 to 10, the means being configured for using the power property to derive a corresponding threshold for a crest factor reduction of signals during the transmission period.

Clause 12. The apparatus of any of the preceding clauses 1 to 11, the means of the apparatus comprises at least one processor; and at least one memory including computer program code, the at least one memory and computer program code configured to, with the at least one processor, perform the method of clause 13.

Clause 13. A method for data transmission in a wireless communication system using a pattern comprising transmission periods, the method comprising: determining a power property for transmission of data in an entire upcoming scheduled transmission period, the power property indicating a power for transmission of the data; determining a drain voltage value for a power amplifier of the apparatus using the power property; determining whether an adjustment of the power amplifier to the determined drain voltage value requires an increase or a reduction of a current drain voltage of the power amplifier; in case a reduction of the drain voltage is required, identifying a transmission interruption period, of the pattern, that precedes the upcoming transmission period; and performing during the identified transmission interruption period a drain voltage reduction of the power amplifier to the determined drain voltage value; in case an increase of the drain voltage is required, performing during the transmission interruption period or transmission period a drain voltage increase of the power amplifier to the determined drain voltage value.

Example 1: A transmitter for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, the transmitter comprising: at least one processor; and at least one memory storing instructions that, when executed by the at least one processor, cause the transmitter at least to perform: receiving a sequence of datasets of a low-latency application, each dataset of the datasets comprising a succession of a first sub-dataset and a second sub-dataset; successively transmitting radio frequency signals in an order of the sequence of the datasets such that the number of radio frequency signals is equal to the number of datasets, each radio frequency signal of the radio frequency signals comprising a dataset of the datasets; wherein each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration higher than or equal to a minimum duration; and a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, wherein the end of the first time segment is adjacent to the beginning of the second time segment, each second time segment of the second time segments having a starting point of time; wherein the transmitting of the radio frequency signals is performed such that: a minimum fraction of the starting points of time is in an earliest scheduling time slot or in an earliest but one scheduling time slot of a transmission period of the transmission periods.

Example 2: A non-transitory computer readable medium for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, the non-transitory computer readable medium comprising program instructions that, when executed by a sender apparatus, cause the transmitter to perform at least the following: receiving a sequence of datasets of a low-latency application, each dataset of the datasets comprising a succession of a first sub-dataset and a second sub-dataset; successively transmitting radio frequency signals in an order of the sequence of the datasets such that the number of radio frequency signals is equal to the number of datasets, each radio frequency signal of the radio frequency signals comprising a dataset of the datasets; wherein each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration higher than or equal to a minimum duration; and a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, wherein the end of the first time segment is adjacent to the beginning of the second time segment, each second time segment of the second time segments having a starting point of time; wherein the transmitting of the radio frequency signals is performed such that: a minimum fraction of the starting points of time is in an earliest scheduling time slot or in an earliest but one scheduling time slot of a transmission period of the transmission periods.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g)NodeB) 114 providing or serving devices in a cell. In one example, the node 114 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well. 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
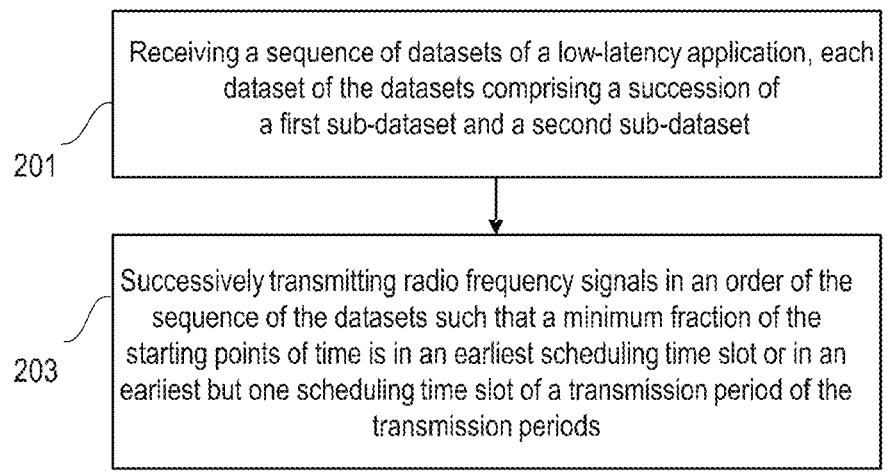
FIG. 2 is a flowchart of a method for data transmission in a wireless communication system using a pattern comprising transmission periods according to an example of the present subject matter.

FIG. 2 is a flowchart of a method according to an example of the present subject matter. For the purpose of explanation, the method described in FIG. 2 may be implemented in the system illustrated in FIG. 1, but is not limited to this implementation. The method may, for example, be performed by a transmitter which may be the node 114 or part of the node 114.

The transmitter 114 may be provided with a pattern comprising transmission periods. Each transmission period of the transmission periods is split into one or more scheduling time slots, wherein each scheduling time slot of the transmission periods has a duration smaller than or equal to a duration threshold. Each transmission period of the transmission periods starts when a transmission starts in the transmission period and ends when the transmission in the transmission period ends.

A sequence of datasets of a low-latency application may be received in step 201. Each dataset of the datasets comprises a succession of a first sub-dataset and a second sub-dataset.

Radio frequency signals may be transmitted successively in step 203. The radio frequency signals may be transmitted successively in an order of the sequence of the datasets. The transmission of the radio frequency signals may be performed such that the number of radio frequency signals is equal to the number of datasets and such that each radio frequency signal of the radio frequency signals comprises a dataset of the datasets.

Each radio frequency signal of the radio frequency signals comprises: a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration higher than or equal to a minimum duration.

Each radio frequency signal of the radio frequency signals comprises: a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, wherein the end of the first time segment is adjacent to the beginning of the second time segment, each second time segment of the second time segments having a starting point of time.

The transmission of the radio frequency signals in step 203 is performed such that: a minimum fraction of the starting points of time is in an earliest scheduling time slot or in an earliest but one scheduling time slot of a transmission period of the transmission periods.

Figure 3:
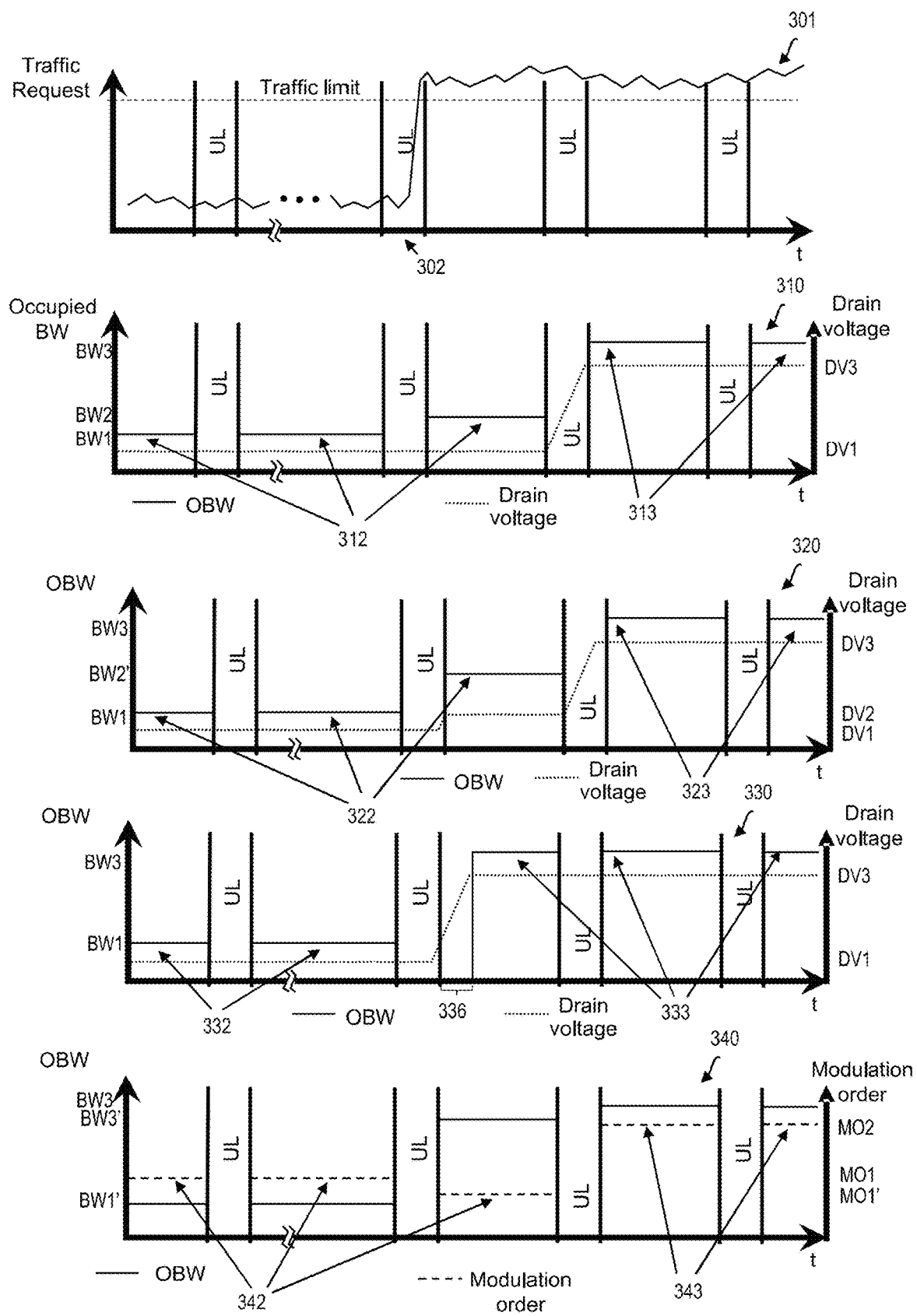
FIG. 3 depicts diagrams illustrating traffic request versus time resulting from a dataset as well as occupied bandwidth and modulation order of radio frequency signals for transmitting the dataset by a transmitter in accordance with an example of the present subject matter.

FIG. 3 depicts diagrams illustrating a dataset and radio frequency signals for transmitting the dataset by a transmitter in accordance with an example of the present subject matter. The transmitter may, for example, be the node 114 or part of the node 114 of FIG. 1.

The diagram 301 shows a traffic request profile over time for TDD operation. The traffic requests may be created by a connection to a UE e.g., between the node 114 and the UE 102. The traffic request may refer to the reception of data units of the dataset. At the beginning, there is a low traffic request for the UE. To minimize periods of DTX, this low traffic request may require being served with low latency. This low traffic load may require just a part of the available transmitter bandwidth resources. Thus, a reduced peak power and DV of the power amplifier of the transmitter may be sufficient. As shown with diagram 301, within an UL period, a huge traffic request 302 appears which exceeds the available transmitter bandwidth resources and persists also for several transmission (TX) periods thereafter. This huge traffic request may need to be served with the full peak power capability which may only be available at full DV.

The diagrams 310, 320, 330 and 340 of FIG. 3 illustrate possible reactions of the transmitter to the traffic requests shown in diagram 301.

The diagram 310 illustrates an example radio frequency signal that comprises the dataset represented by the diagram 301. In particular, the diagram 310 illustrates the observable traffic in terms of bandwidth resources being occupied by the radio frequency signal. Before the huge traffic request 302 is received, the radio frequency signal may have an occupied bandwidth (OBW) equal to BW1, and the drain voltage may be low (DV1). As no DV increase is available within the next DL period immediately following the huge traffic request 302, the traffic may be limited to the equivalent of the reduced peak power capability of the PA at this low drain voltage DV1, and the OBW may be limited to BW2. During the next UL period, the drain voltage may be ramped up from DV1 to the full drain voltage DV3. Right after the next UL period, the full traffic can be provided using full DV and the occupied bandwidth may be BW3. The radio frequency signal illustrated with diagram 310 may comprise the first time-domain signal part 312 and the second time-domain signal part 313.

The diagram 320 illustrates an example radio frequency signal that comprises the dataset represented by the diagram 301. As with the example of diagram 310, before the huge traffic request 302 is received, the radio frequency signal may have the occupied bandwidth BW1, and the drain voltage may be low (DV1). However, in contrast to the example of diagram 310, the transmitter may make a slightly increased DV from DV1 to DV2 between the huge traffic request 302 and the beginning of the next DL period. During this next DL period, the OBW is limited to BW2' by the reduced peak power capability of the PA at a medium drain voltage DV2, where the occupied bandwidth BW2' is higher than the occupied bandwidth BW2 of the diagram 310. During the next UL period, the drain voltage may be ramped up from DV2 to the full drain voltage DV3. Right after the next UL period, the full traffic can be provided using full DV and the occupied bandwidth may be BW3. The radio frequency signal illustrated with diagram 320 may comprise the first time-domain signal part 322 and the second time-domain signal part 323. In this example, it is assumed that BW2' is still smaller than or equal to the first bandwidth threshold and that hence the transmission period shown in the middle of FIG. 320 belongs to the first time-domain signal part 322. If BW2' was already higher than or equal to the second bandwidth threshold, this transmission period would belong to the second time-domain signal part 323.

The diagram 330 illustrates an example radio frequency signal that comprises the dataset represented by the diagram 301. As with the example of diagrams 310 and 320, before the huge traffic request 302 is received, the radio frequency signal may have the occupied bandwidth BW1, and the drain voltage may be low (DV1). After the huge traffic request was detected, no transmission takes place in the time interval 336 right after the UL period. Between the huge traffic request 302 and the end of the time interval 336, the drain voltage may be ramped up from DV1 to the full drain voltage DV3. The time interval 336 may be a DTX. However, after the full DV is available and has sufficiently stabilized, full traffic is provided to the UE when the DL transmission resumes, allowing to occupy (at least almost) the cell's entire bandwidth BW3. The radio frequency signal illustrated with diagram 330 may comprise the first time-domain signal part 332 and the second time-domain signal part 333.

The diagram 340 illustrates an example radio frequency signal that comprises the dataset represented by the diagram 301. In this example, both the occupied bandwidth and the modulation scheme are adapted based on the traffic. This is illustrated in diagram 340. Before the huge traffic request 302 is received, the radio frequency signal may have the occupied bandwidth BW1' and the modulation scheme being used to encode data of the dataset in the radio frequency signal has a modulation order MO1. The occupied bandwidth BW1' may be different from the occupied bandwidth BW1 of the previous examples. After the huge traffic request was detected, the occupied bandwidth may be increased to BW3' and the modulation order may be decreased to MO1'. This may be possible even if a small or a partial DV increase is available from the beginning of the next DL period that immediately follows the huge traffic request 302. The considerable increase of the occupied bandwidth is possible because, during that next DL period, the DV has already increased a bit and the modulation order is kept small at MO1 or even reduced. Right after the next UL period, the full DV is available, the occupied bandwidth may be increased to BW3, and the modulation order may be increased to MO2. The radio frequency signal illustrated with diagram 340 may comprise the first time-domain signal part 342 and the second time-domain signal part 343.

In the examples of FIG. 3, the occupied bandwidths BW1, BW1', BW2 and BW2' are smaller than or equal to the first bandwidth threshold and the occupied bandwidths BW3 and BW3' are higher than or equal to the second bandwidth threshold. In diagram 340, the modulation order MO1' is below the certain modulation order and the modulation order MO2 is at least the certain modulation order.

Figure 4A:
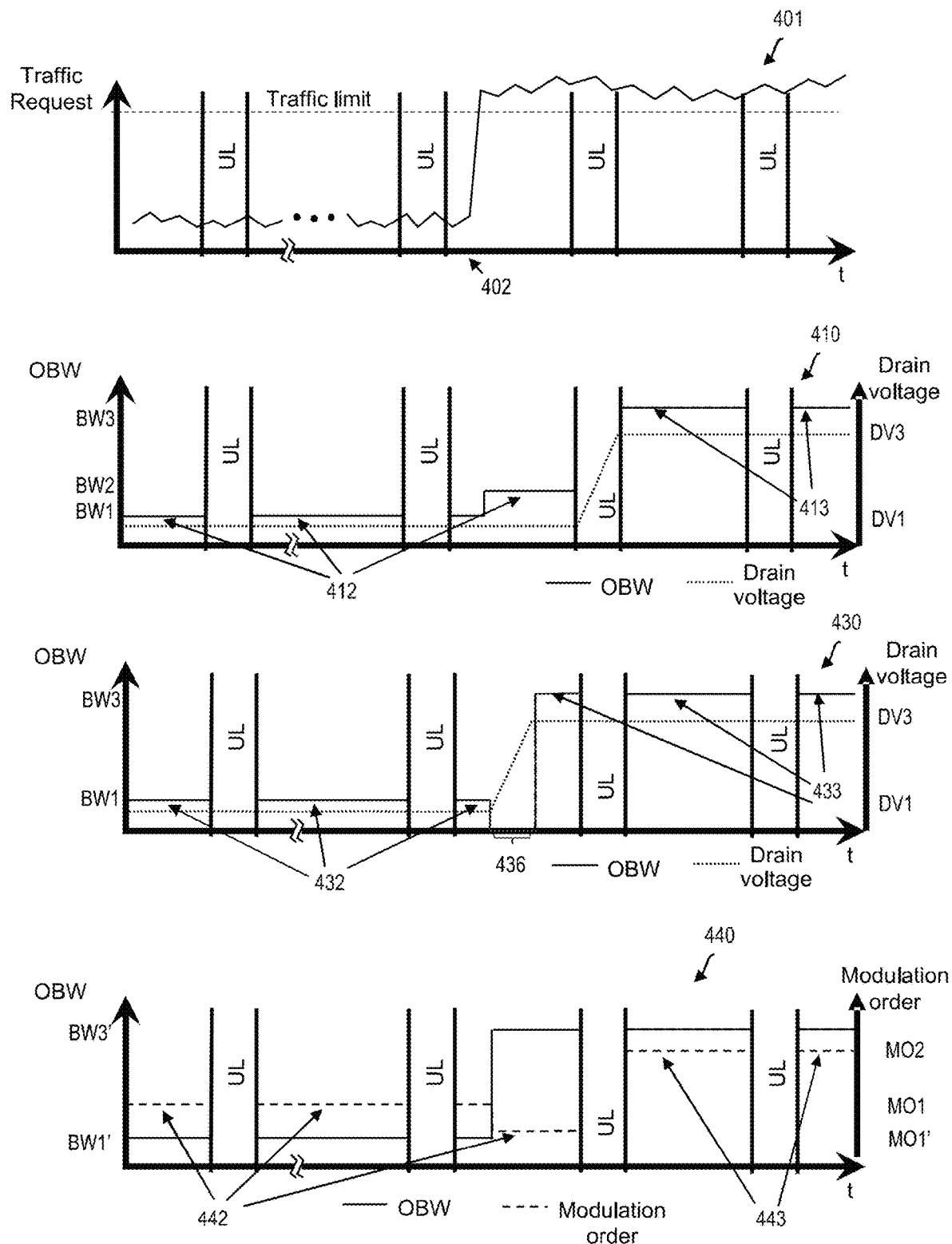
FIG. 4A depicts diagrams illustrating a dataset as well as occupied bandwidth and modulation order of radio frequency signals for transmitting the dataset by a transmitter in accordance with an example of the present subject matter.

FIG. 4A depicts diagrams illustrating a dataset and radio frequency signals for transmitting the dataset by a transmitter in accordance with an example of the present subject matter. The transmitter may, for example, be the node 114 or part of the node 114 of FIG. 1.

The diagram 401 shows a traffic request profile over time for TDD operation. The traffic requests may be created by a connection to a UE e.g., between the node 114 and the UE 102.

The traffic request may refer to the reception of data units of the dataset. At the beginning, there is a low traffic request for the UE. To minimize periods of DTX, this low traffic request may require being served with low latency. This low traffic load may require just a part of the available transmitter bandwidth resources. Thus, a reduced peak power and DV of the power amplifier of the transmitter may be sufficient. As shown with diagram 401, within an DL period, a huge traffic request 402 appears which exceeds the available transmitter bandwidth resources and persists also for several TX periods thereafter. This huge traffic request may need to be served with the full peak power capability which may only be available at full DV.

The diagrams 410, 430 and 440 of FIG. 4A illustrate possible reactions of the transmitter to the traffic requests shown in diagram 401.

The diagram 410 illustrates an example radio frequency signal that comprises the dataset represented by the diagram 401. In particular, the diagram 410 illustrates the observable traffic in terms of bandwidth resources being occupied by the radio frequency signal. Before the huge traffic request 402 is received, the radio frequency signal may have an occupied bandwidth BW1, and the drain voltage may be low (DV1). As no DV increase is available within the DL period during which the huge traffic request 402 is received, the traffic may be limited to the equivalent of the reduced peak power capability of the PA at this low drain voltage DV1, and the OBW may be limited to BW2. During the next UL period, the drain voltage may be ramped up from DV1 to the full drain voltage DV3. Right after the next UL period, the full traffic can be provided using full DV and the occupied bandwidth may be BW3. The radio frequency signal illustrated with diagram 410 may comprise the first time-domain signal part 412 and the second time-domain signal part 413.

The diagram 430 illustrates an example radio frequency signal that comprises the dataset represented by the diagram 401. As with the example of diagram 410, before the huge traffic request 402 is received, the radio frequency signal may have the occupied bandwidth BW1, and the drain voltage may be low (DV1). After the huge traffic request was detected, no transmission takes place in the time interval 436 right after the request 402. During the time interval 436, the drain voltage may be ramped up from DV1 to the full drain voltage DV3. However, after the full DV is available and has sufficiently stabilized, full traffic is provided to the UE when the DL transmission resumes, allowing to occupy (at least almost) the cell's entire bandwidth BW3. The radio frequency signal illustrated with diagram 430 may comprise the first time-domain signal part 432 and the second time-domain signal part 433.

The diagram 440 illustrates an example radio frequency signal that comprises the dataset represented by the diagram 401. In this example, both the occupied bandwidth and the modulation scheme are adapted based on the traffic. This is illustrated in diagram 440. Before the huge traffic request 402 is received, the radio frequency signal may have an occupied bandwidth BW1' and the modulation scheme being used to encode data of the dataset in the radio frequency signal has a modulation order MO1. The occupied bandwidth BW1' may be different from the occupied bandwidth BW1 of the previous examples. After the huge traffic request 402 was detected, the occupied bandwidth may be increased to BW3' and the modulation order may be decreased to MO1'. The considerable increase of the occupied bandwidth is possible because the modulation order is reduced so that the resulting signal quality degradation is tolerable. Right after the next UL period, the full DV is available, and the modulation order may be increased to MO2. The radio frequency signal illustrated with diagram 440 comprises the first time-domain signal part 442 and the second time-domain signal part 443.

In the examples of FIG. 4A, the occupied bandwidths BW1, BW1' and BW2 are smaller than or equal to the first bandwidth threshold and the occupied bandwidths BW3 and BW3' are higher than or equal to the second bandwidth threshold. In diagram 440, the modulation order MO1' is below the certain modulation order and the modulation order MO2 is at least the certain modulation order.

Thus, according to one example, the radio frequency signals shown in FIGS. 3 and 4A may be provided by a base station. The base station is in a wireless TDD communication system serving a time-variant DL user data load or DL traffic with a scheduler for allocating DL radio resources of the base station to the DL user data, with a time-variant aggregated bandwidth B being occupied by signal components, $B_{max}$ denoting the maximum value of B that the base station uses, with a scheduling period lasting ≤1 ms, wherein, after a period τ with τ≥10 ms during which the highest value of B was $B_0$ with $B_0 \le 0.6 B_{max}$ and the longest duration of not transmitting was ≤2.5 ms, the base station increases B to $B_1$ with $B_1 \ge 0.85 B_{max}$ or the modulation order of the data transmission from predominantly quaternary to predominantly at least 16-ary when there is an abrupt, large rise in DL traffic that results in $B_1 \ge 0.85 B_{max}$ being filled, in more than half of the cases at the beginning of a DL period by the DL period's second scheduling period. DL radio resources can be characterized in frequency direction by frequency intervals that are used for synchronization, reference signals, broadcast information, signaling, and/or data transmission. The aggregated bandwidth may be the sum of the widths of these frequency intervals and exclude other (e.g. unused) frequency intervals in between. The aggregated bandwidth may be assessed per symbol period (the currently used shortest symbol period when different symbol periods are in use). Examples of a scheduling period may be a transmission time interval (TTI) or a short TTI (sTTI) in LTE and a slot or a mini-slot in NR. A 'case' refers to the abrupt, large rise in DL traffic after the long period of little traffic. This means that this increase in aggregated bandwidth or modulation order is not expected to happen again right at the beginning of the next DL period. It is expected to happen again when, after another period τ with τ≥10 ms during which the highest value of B was $B_0$ with $B_0 \le 0.6 B_{max}$ and the longest duration of not transmitting was ≤2.5 ms, there is an abrupt, large rise in requested DL traffic that results in $B_1 \ge 0.85 B_{max}$ being filled. The user data may require low latency.

"In more than half of the cases" means that this increase in aggregated bandwidth or modulation order predominantly happens at the beginning of a DL period, and in a minority of cases, it may happen also in the third scheduling period of or later during a DL period.

Figure 4B:
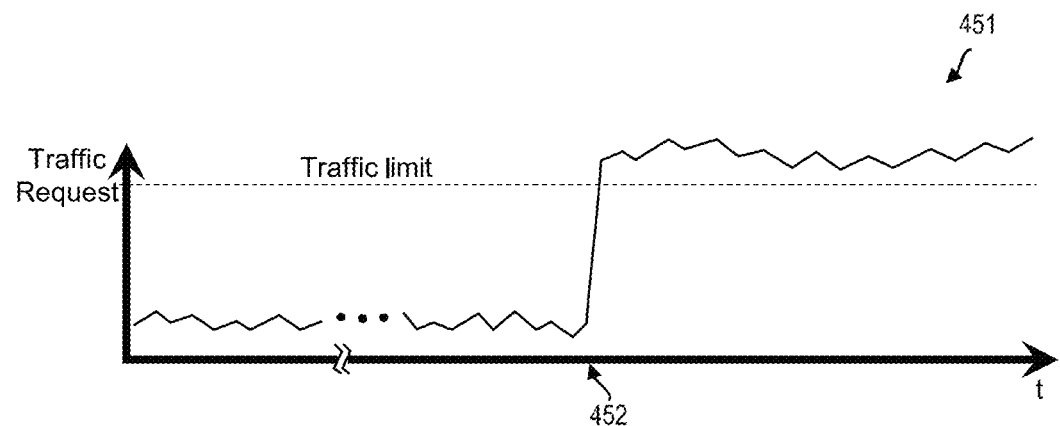
FIG. 4B depicts diagrams illustrating a dataset as well as occupied bandwidth and modulation order of radio frequency signals for transmitting the dataset by a transmitter in accordance with an example of the present subject matter.
Figure 4B:
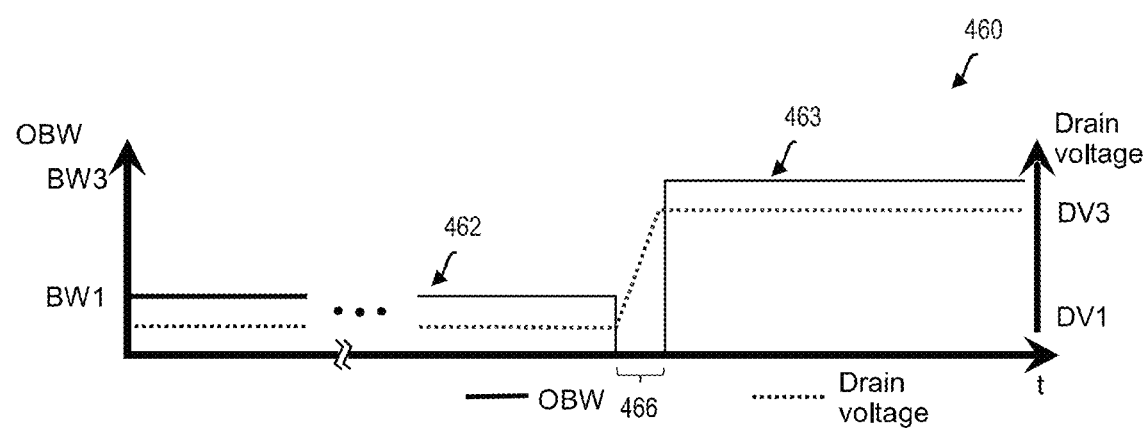
Figure 4B:
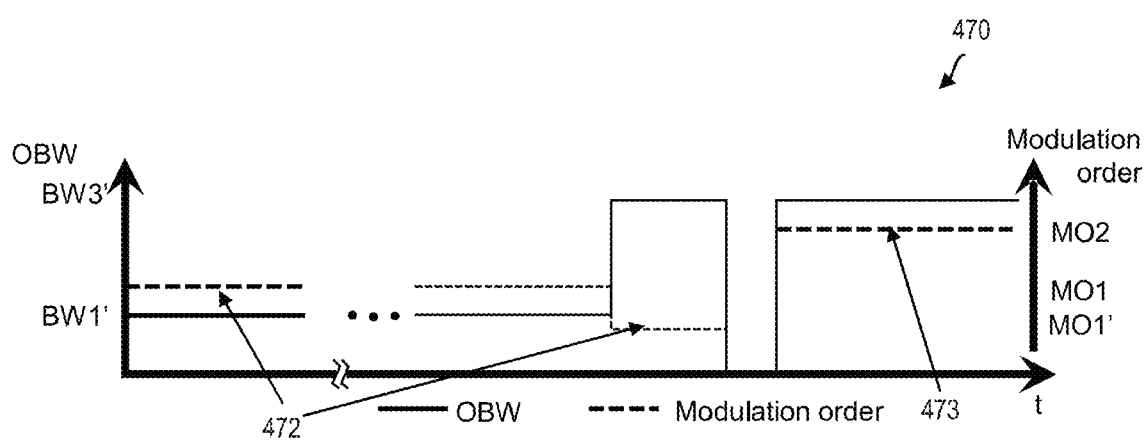

FIG. 4B depicts diagrams illustrating a dataset and radio frequency signals for transmitting the dataset by a transmitter in accordance with an example of the present subject matter. The transmitter may, for example, be the node 114 or part of the node 114 of FIG. 1.

The diagram 451 shows a traffic request profile over time. The diagrams 460 and 470 of FIG. 4B illustrate possible reactions of the transmitter to the traffic requests shown in diagram 451.

The diagram 460 illustrates an example radio frequency signal that comprises the dataset represented by the diagram 451. Before the huge traffic request 452 is received, the radio frequency signal may have the occupied bandwidth BW1, and the drain voltage may be low (DV1). After the huge traffic request 452 was detected, no transmission takes place in the time interval 466 right after the UL period. Between the huge traffic request 452 and the end of the time interval 466, the drain voltage may be ramped up from DV1 to the full drain voltage DV3. However, after the full DV is available and has sufficiently stabilized, full traffic is provided to the UE when the DL transmission resumes, allowing to occupy (at least almost) the cell's entire bandwidth BW3. The radio frequency signal illustrated with diagram 460 may comprise the first time-domain signal part 462 and the second time-domain signal part 463.

The diagram 470 illustrates an example radio frequency signal that comprises the dataset represented by the diagram 451. In this example, both the occupied bandwidth and the modulation scheme are adapted based on the traffic. This is illustrated in diagram 470. Before the huge traffic request 452 is received, the radio frequency signal may have an occupied bandwidth BW1' and the modulation scheme being used to encode data of the dataset in the radio frequency signal has a modulation order MO1. The occupied bandwidth BW1' may be different from the occupied bandwidth BW1 of the previous examples. After the huge traffic request 452 was detected, the occupied bandwidth may be increased to BW3' and the modulation order may be decreased to MO1'. Right after the next UL period, the full DV is available, and the modulation order may be increased to MO2. The radio frequency signal illustrated with diagram 470 comprises the first time-domain signal part 472 and the second time-domain signal part 473.

For example, in FDD operation, an upcoming transmission period UTD may be longer than the window for which a forecast information is available. It may even not be clear when there will be the next transmission interruption periods. Consequently, no forecast information may be available for the whole UTD but just within a forecast information window (FIW).

The FIW may be a sliding window but also may be stepwise adapted in an overlapping or non-overlapping way. In case of a stepwise adaptation, the size of each time step may be smaller than or equal to the size of the FIW. Unlike the UTD in TDD, the FIW may begin before the next transmission interruption period.

The amplification apparatus may repeatedly perform a conditional DV update as follows: The amplification apparatus may search for an opportunity to insert a transmission interruption period. The latest FIW may at least cover an upcoming period to the next such opportunity. The case that there is no such opportunity in the foreseeable future will be considered later. An inserted transmission interruption period may usually be a DTX period. In the case of only little risk of cross-link interference, an inserted transmission interruption period may comprise an UL period.

Shortly before the opportunity to insert a transmission interruption period, the amplification apparatus may gather the forecast information inside the latest available FIW for estimating the power property. A FIW looking farther into the future than just to the next opportunity to insert a transmission interruption period is advantageous, also because for a DV increase, the transmission interruption period may result in the short run in a further increase of the data buffer's level and of the latency. Since, typically, there is no short-term benefit from inserting a transmission interruption period for a DV increase, a FIW length may be chosen large enough to assess whether an insertion of a transmission interruption period for a DV increase nevertheless provides an overall benefit.

If the estimate of the power property requires an increase or allows for a significant decrease of the peak power capability, said opportunity may be taken to insert a transmission interruption period for performing a drain voltage change of the power amplifier (in diagram 460 from DV1 to DV3). The targeted peak power capability may be derived from the updated power property and may determine the drain voltage value to which the drain voltage of the power amplifier may be adjusted when the transmission interruption period is made. Otherwise (i.e. if neither a DV increase is needed nor a significant DV decrease is possible), the same drain voltage may be kept until a forecast information update is available for a new FIW.

In the case that there is no opportunity to insert a transmission interruption period in the foreseeable future or not early enough to meet the latency requirements, the amplification apparatus may estimate the power property for the foreseeable future, considering the latency requirements. If this estimate requires an increase of the drain voltage, the drain voltage may be increased during a transmission period, but the drain voltage increase may need to be limited such that the resulting unwanted emissions still fulfil the requirements. The conditional DV update may be repeated for each FIW.

When a transmission interruption period is identified, created, inserted etc. in the context of DV ramping, a transmission interruption period may be meant that lasts sufficiently long for performing the intended DV ramping.

A DV change may be distributed over more than one transmission interruption period. During the one or more transmission periods in between, the drain voltage(s) may be kept constant. This may e.g. be useful if the intended DV change lasts longer than a single transmission interruption period.

A DV ramp-up may also be performed during a combination of a transmission interruption period and one or two transmission periods. In one example, a DV ramp-up may begin during a transmission interruption period and end during the following transmission period. This may e.g. be useful if a traffic request requiring a DV ramp-up is received during a transmission interruption period, the DV ramp-up can begin but cannot finish during the remaining part of the transmission interruption period and if the unwanted emissions resulting from the part of the DV ramp-up falling into the following transmission period are compatible with relevant unwanted emissions requirements. In one example, a DV ramp-up may begin during a transmission period and end during the following transmission interruption period or during the following transmission period. This may allow for an early DV increase without requiring to wait until there is a sufficiently long transmission interruption period or without requiring the insertion of a sufficiently long transmission interruption period for the entire ramp-up, provided that the unwanted emissions resulting from the part of the DV ramp-up falling into the one or two transmissions periods are compatible with relevant unwanted emissions requirements. The share of the DV ramp-up during the one or two transmission periods may be made as big as relevant unwanted emissions requirements (optionally including a margin) allow. The DV ramp-up need not be contiguous. For example, its first part may begin already soon after a traffic request requiring the DV ramp-up is received. Its second part may begin at the beginning of the following transmission interruption period.

Figure 5A:
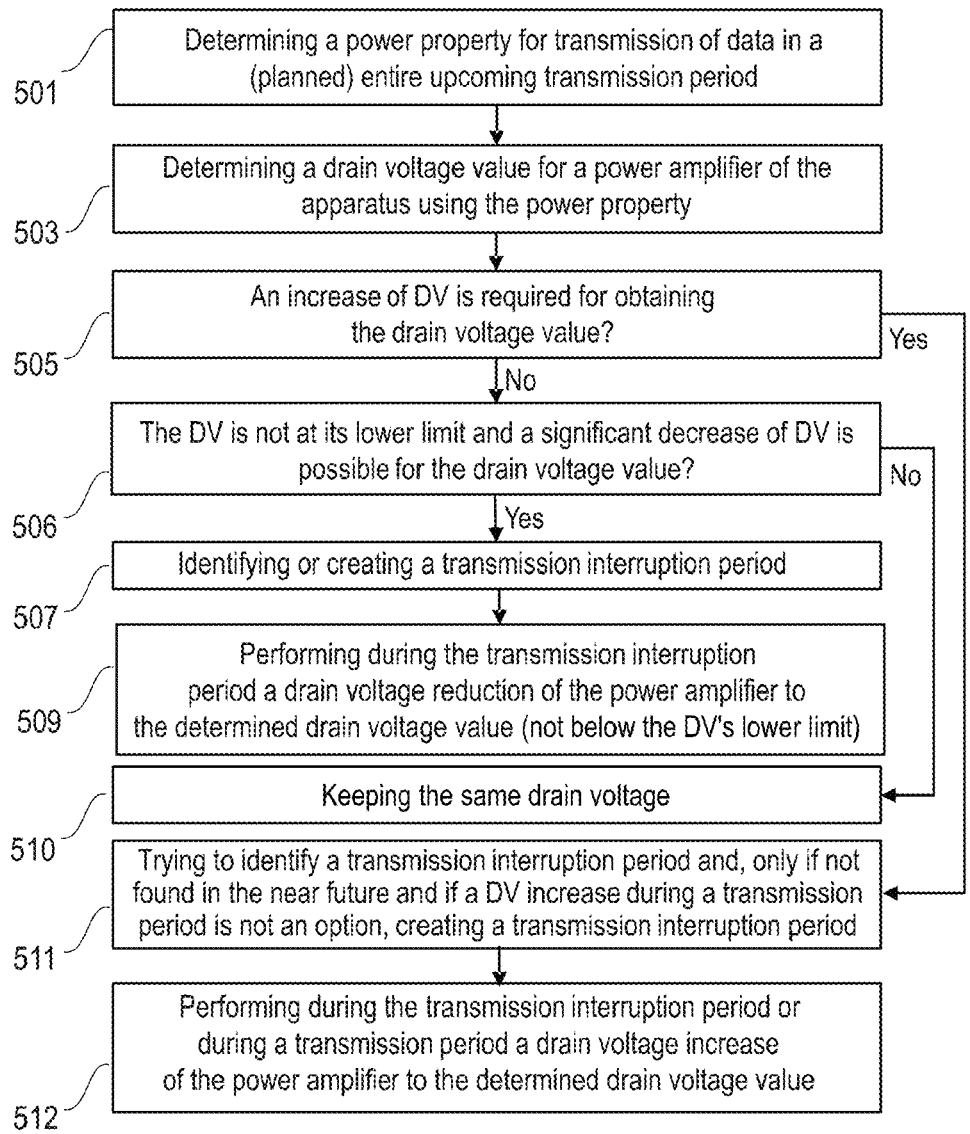
FIG. 5A is a flowchart of a method for adapting a power amplifier for data transmission in a wireless communication system using a pattern comprising transmission periods according to an example of the present subject matter.

FIG. 5A is a flowchart of a method for adapting a power amplifier for data transmission in a wireless communication system using a pattern comprising transmission periods according to an example of the present subject matter. For the purpose of explanation, the method described in FIG. 5A may be implemented in the system illustrated in FIG. 1, but is not limited to this implementation. The method may, for example, be performed by an apparatus which may for example be part of node 114.

A power property for transmission of data in an entire upcoming scheduled transmission period may be determined in step 501. The power property indicates a power for transmission of the data.

A drain voltage value for a power amplifier of the apparatus may be determined in step 503 using the power property.

It may be determined (step 505) whether an adjustment of the power amplifier to the determined drain voltage value requires an increase or allows for a reduction of a current drain voltage of the power amplifier.

In case a reduction of the drain voltage is possible, it may be determined (step 506) whether a DV condition is fulfilled, wherein the DV condition comprises: the DV is not at its lower limit and a significant decrease of DV is possible for the drain voltage value. "Significant" means larger than a certain step size, for example 5V. If the DV condition is fulfilled, a transmission interruption period, of the pattern, that precedes the upcoming transmission period may be identified in step 507 and during the identified transmission interruption period a drain voltage reduction of the power amplifier to the determined drain voltage value may be performed in step 509. If the DV condition is not fulfilled, the same drain voltage may be kept in step 510.

In case an increase of the drain voltage is required, a transmission interruption period may be searched in step 511 and, only if not found in the near future and if a DV increase during a transmission period is not an option, a transmission interruption period may be created. During the transmission interruption period or during a transmission period a drain voltage increase of the power amplifier to the determined drain voltage value may be performed in step 512.

In one example implementation of the present method, the transmission period may be a DL period and the apparatus of the method may be part of a base station that serves user equipments. To avoid the signal quality degradation during DV ramping, DV ramping may be restricted to periods of inactive DL. While DV ramping during UL periods may be performed only for TDD and if an UL period is sufficiently long, DV ramping may also be possible during periods of discontinued transmission (DTX) independently of the duplex mode. A combination of UL period and DTX can be used for DV ramping, if the UL periods are too short for DV ramping. Still, restricting the DV ramping to periods of inactive DL may result in a constant DV for each active DL period. Consequently, the TX peak power may need to be restricted for each symbol according to the selected DV in the current active DL period. This may require assistance from the scheduler.

Figure 5B:
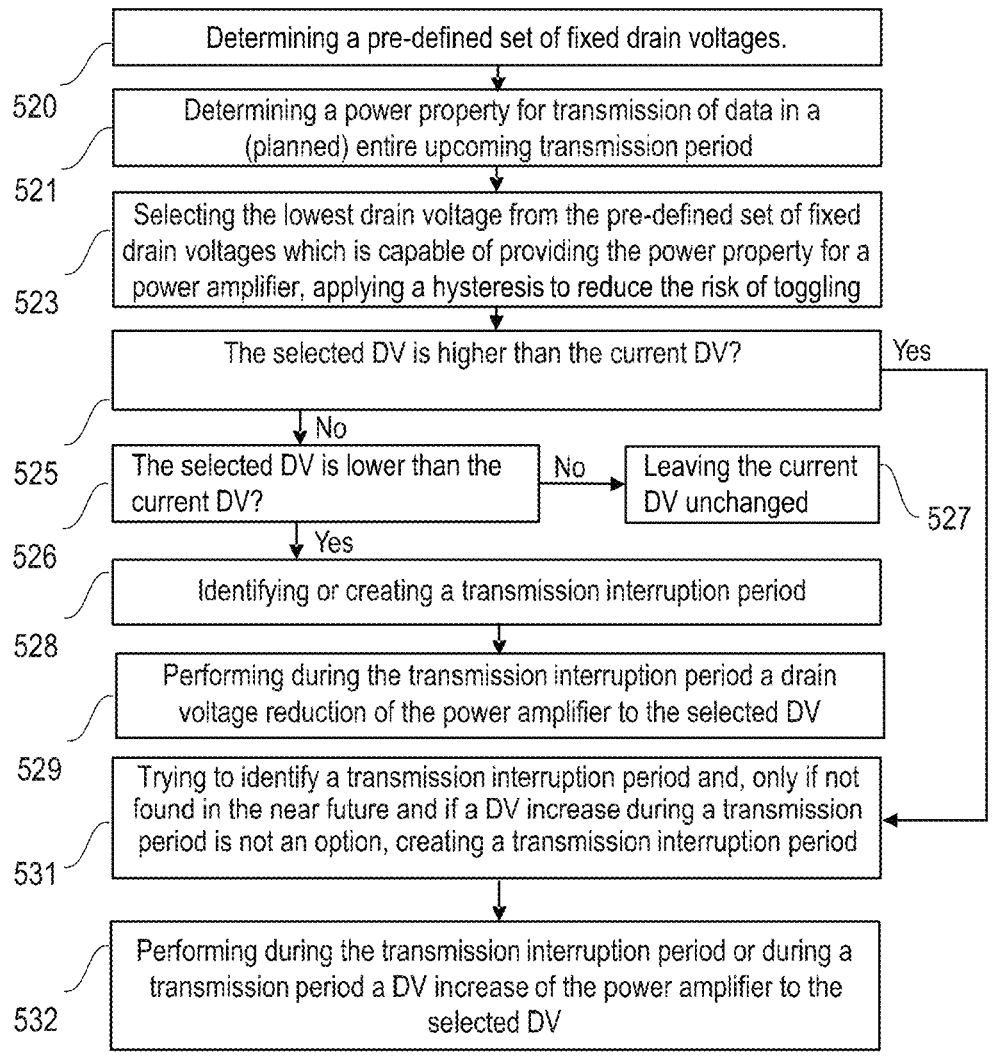
FIG. 5B is a flowchart of a method for adapting a power amplifier for data transmission in a wireless communication system using a pattern comprising transmission periods according to an example of the present subject matter.

FIG. 5B is a flowchart of a method for adapting a power amplifier for data transmission in a wireless communication system using a pattern comprising transmission periods according to an example of the present subject matter. For the purpose of explanation, the method described in FIG. 5B may be implemented in the system illustrated in FIG. 1, but is not limited to this implementation. The method may, for example, be performed by an apparatus which may for example be part of node 114.

A pre-defined set of fixed drain voltages may be determined in step 520.

A power property for transmission of data in an entire upcoming scheduled transmission period may be determined in step 521. The power property indicates a power for transmission of the data.

The lowest drain voltage which is capable of providing the power property for a power amplifier may be selected in step 523 from the pre-defined set of fixed drain voltages and a hysteresis to reduce the risk of toggling may be applied.

It may be determined (step 525) whether the selected DV is higher than the current DV.

If the selected DV is not higher than the current DV, it may be determined (step 526), whether the selected DV is lower than the current DV and if the selected DV is not lower than the current DV, the current DV may be left unchanged in step 527. However, if the selected DV is lower than the current DV, a transmission interruption period, of the pattern, that precedes the upcoming transmission period may be identified in step 528. During the identified transmission interruption period a drain voltage reduction of the power amplifier to the determined drain voltage value may be performed in step 529.

If the selected DV is higher than the current DV, a transmission interruption period may be searched in step 531 and, only if not found in the near future and if a DV increase during a transmission period is not an option, a transmission interruption period may be created. During the transmission interruption period or during a transmission period a drain voltage increase of the power amplifier to the determined drain voltage value may be performed in step 532.

Figure 5C:
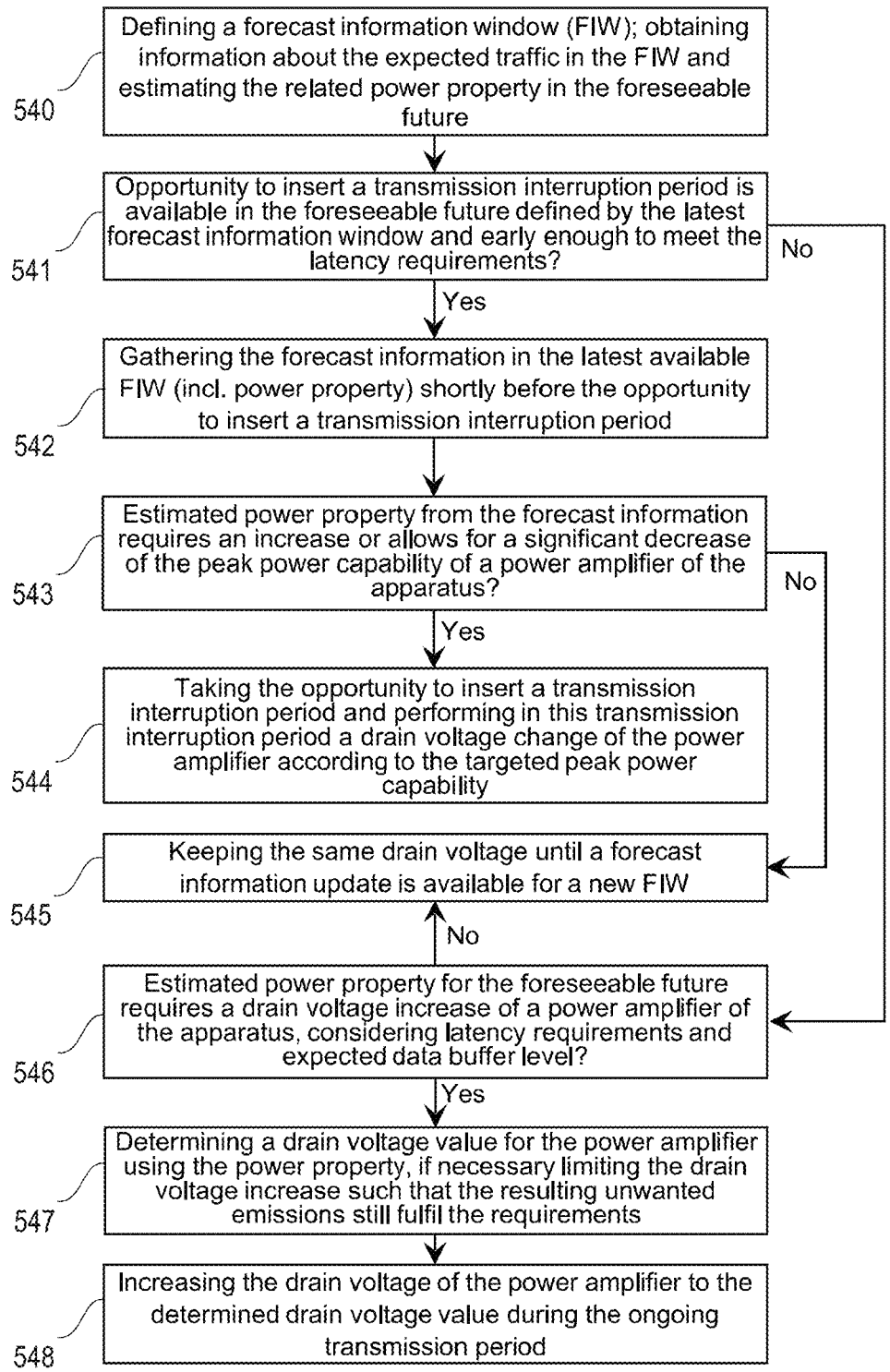
FIG. 5C is a flowchart of a method for adapting a power amplifier for data transmission in a wireless communication system using a pattern comprising transmission periods according to an example of the present subject matter.

FIG. 5C is a flowchart of a method for adapting a power amplifier for data transmission in a wireless communication system using a pattern comprising transmission periods according to an example of the present subject matter. For the purpose of explanation, the method described in FIG. 5C may be implemented in the system illustrated in FIG. 1, but is not limited to this implementation. The method may, for example, be performed by an apparatus which may for example be part of node 114.

A forecast information window (FIW) may be defined in step 540. Information about the expected traffic in the FIW may be obtained in step 540 and the related power property may be estimated in the foreseeable future.

It may be determined (541) whether an opportunity to insert a transmission interruption period is available in the foreseeable future defined by the latest forecast information window and early enough to meet the latency requirements.

If the opportunity is available and early enough to meet the latency requirements, one may gather in step 542 the forecast information in the latest available FIW (incl. power property) shortly before the opportunity to insert a transmission interruption period.

It may be determined (step 543) whether a power condition is fulfilled, wherein the power condition comprises: an estimated power property from the forecast information requires an increase or allows for a significant decrease of the peak power capability of a power amplifier of the apparatus. If the power condition is fulfilled, the opportunity to insert a transmission interruption period may be taken in step 544 and a drain voltage change of the power amplifier according to the targeted peak power capability may be performed in this transmission interruption period. If the power condition is not fulfilled, the same drain voltage may be kept in step 545 until a forecast information update is available for a new FIW.

If the opportunity is not available and/or not early enough to meet the latency requirements, it may be determined whether (546) an estimated power property for the foreseeable future requires a drain voltage increase of a power amplifier of the apparatus, considering latency requirements and expected data buffer level. If not, step 545 may be performed. Otherwise, a drain voltage value may be determined in step 547 for the power amplifier using the power property and if necessary the drain voltage increase may be limited such that the resulting unwanted emissions still fulfil the requirements. The drain voltage of the power amplifier may be increased in step 548 to the determined drain voltage value during the ongoing transmission period.

Figure 6:
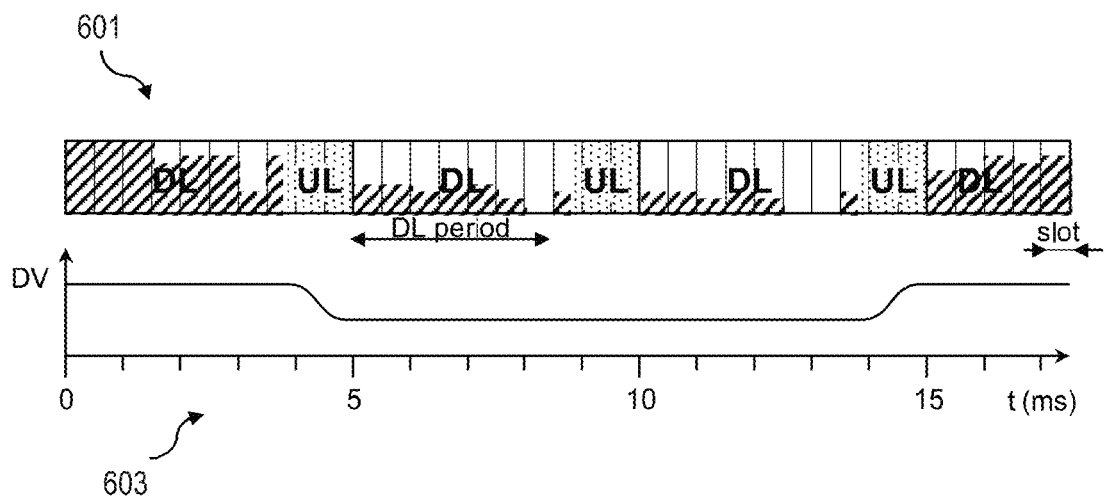
FIG. 6 is a schematic illustration of drain voltage (DV) ramping during uplink (UL) periods for Time Division Duplex (TDD) operation according to an example of the present subject matter.

FIG. 6 is a schematic illustration of DV ramping during some UL periods for TDD operation. The upper part 601 shows an example for differently loaded DL slots. As shown in graph 603, the DV level is adapted to the maximum TX peak power in each period of active DL transmission. During each active DL period, the DV level does not change and hence avoids an unpredictable impact on the amplification device properties which may degrade the signal quality.

In case of a sudden unexpected demand of a traffic increase while the DV is still at a low level, the DVM controller of the amplification apparatus may perform one of the following three actions:

Do nothing and wait till the end of a regular active DL period before triggering a DV ramp-up. Prioritize (prefer the transmission of) the most urgent traffic.

If waiting for the regular DV ramp-up may not be an option, the DV controller may force a period of UL or DTX or a combination thereof to perform an 'emergency' DV ramp-up or switch-up.

If waiting for the regular DV ramp-up or forcing of an UL period or DTX may not be an option, the DL transmission may be continued during 'emergency' DV ramp-up or switch-up. Knowing that a DV ramping or switching during an active DL period may degrade the signal quality, the MCS or rank of a transmission can be reduced during the ramping or switching period. Alternatively, scheduling of traffic with already low rank or MCS may be favored during the DV ramping or switching period. To mitigate the Digital Pre-Distortion (DPD)'s difficulty to linearize the PA characteristic during this DV ramp-up, the Power Supply Unit (PSU) may, e.g. by a control loop, increase its voltage according to a predefined function of the time. This function may depend on the DV at the beginning of the ramp-up, the targeted DV at the end of the ramp-up, and the timing of the scheduling intervals during the ramp-up.

Note that a switch-up may take significantly less than an OFDM symbol. Consequently, in case of DV switching, only a single symbol may be sacrificed for blanking (DTX)

or degraded signal quality. A degraded signal quality of a single OFDM symbol may be covered by proper coding.

Figure 7:
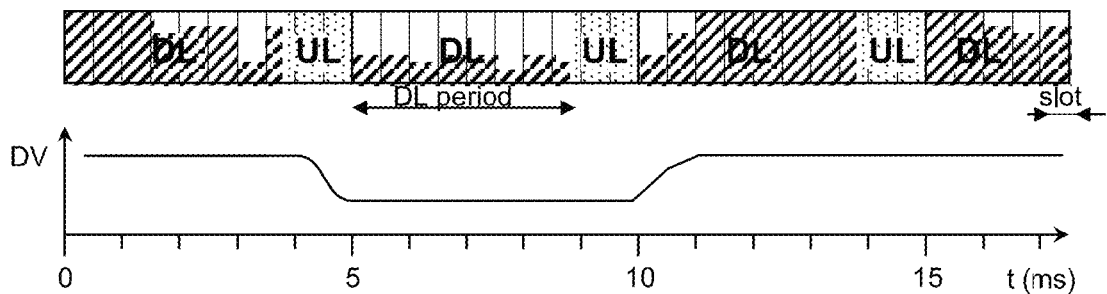
FIG. 7 is a schematic illustration of an 'emergency' DV ramp-up according to an example of the present subject matter.

An example of 'emergency' DV ramp-up is illustrated in FIG. 7, where an unexpected increase of DL traffic with tight latency requirements triggers a DV ramp-up just before the beginning of an active DL period.

FIG. 7 is a schematic illustration of an 'emergency' DV ramp-up, starting at t=9.9 ms. Most of the DV ramp-up may take place during an active DL period. This may happen only at t=9.9 ms, partly because of a lot of negative acknowledgements may be received between t=9 ms and t=9.5 ms, partly because of unexpected other incoming latency-sensitive DL traffic, the DVM controller detects enough DL traffic load for running at the maximum DL capacity during the following DL period. Latency requirements suggest not to delay a substantial share of the DL traffic by 5 ms, which would have been the next opportunity for a regular DV ramp-up. This situation triggers an 'emergency' DV ramp-up at t=9.9 ms. This DV ramp-up affects the two scheduling intervals (slots in this example) from 10 to 10.5 ms and from 10.5 to 11 ms. In each of these two scheduling intervals, the DL traffic load may be the highest load that the DV can support with a sufficient signal quality. The DV as a function of the time in this example may be piecewise linear with a faster rise before t=10.5 ms because the load increases afterwards.

Figure 8A:
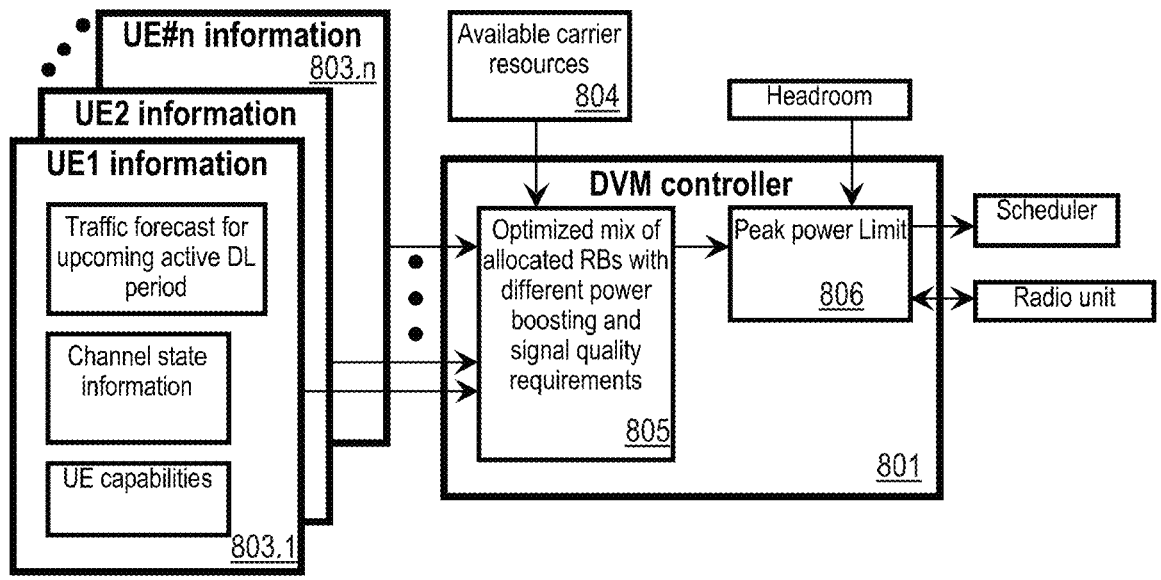
FIG. 8A illustrates a step of the processing of the relevant information for DV ramping or switching according to an example of the present subject matter.

FIG. 8A illustrates the processing of the relevant information for DV ramping or switching. In particular, FIG. 8A illustrates a first step, where a peak power limit 806 is derived from the information available to a DVM controller 801. This example assumes that there is one DVM controller per scheduler instance.

The information available to the DVM controller 801 may be the UE information 803.1 through 803.n on a number n of UEs. Each UE information 803.1-n may include the UE capabilities, the channel state information and a traffic forecast for upcoming active DL period. The UE capabilities may include MCS, maximum transmission rank and/or bandwidth being supported by a UE.

In one example implementation of this first step, the DVM controller 801 may evaluate the peak power limit just by scaling the peak power for full DV with the expected average load during the next active DL period. For example, the DVM controller 801 may evaluate the peak power limit just from the available resources 804 and the expected traffic for an upcoming active DL period without considering power boosting and/or peak power requested for different signal quality requirements. In this example, the headroom being applied to the peak power limit may be increased to a level which considers possible combinations of RB boosting and different signal quality requirements 805.

In one example, the evaluation of the peak power limit may consider the PA's current peak power capability and the hardware capabilities of the power amplifier and its power supply to change the DV. The hardware capabilities may be signaled from the radio unit at least upon initialization. Especially for short transmission interruption periods, the achievable change of the drain voltage and its associated peak power capability may not be sufficient to provide the desirable maximum signal peak power which was evaluated for the UTD in block 805. In this case, the limited power property (derived from the power property of the radio frequency signal during the upcoming transmission interruption period UTD and shown in block 806 as peak power limit) is determined so that the drain voltage change is not larger than enabled by the power amplifier and its power supply during the transmission interruption period. This may be ensured by the block 806's knowledge of how fast the PA incl. power supply can change the peak power capability.

This peak power limit may be signaled by the DVM controller 801 to both, the scheduler and the radio unit. Note that a scheduler instance may have a limited capacity and is just able to serve a subset of carriers, a single carrier or even just a subset of beam directions from an antenna array, so several scheduler instances may be present in a multi-carrier and/or multi-beam constellation.

Figure 8B:
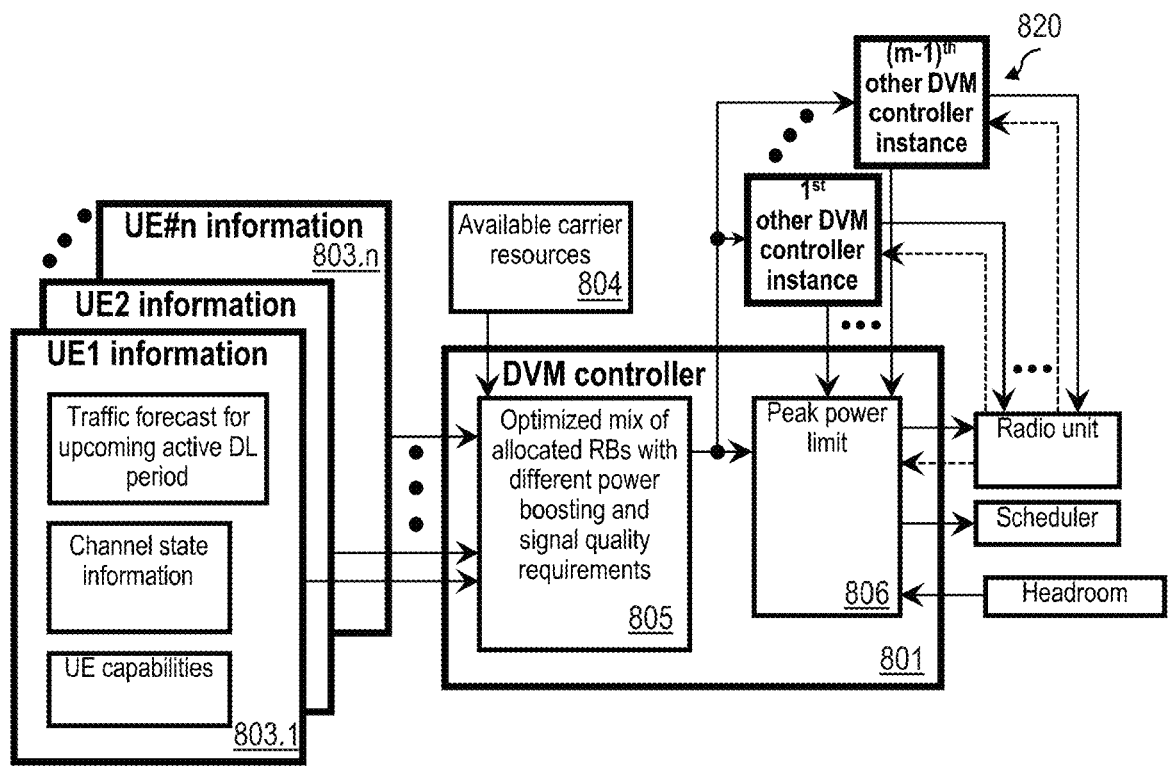
FIG. 8B illustrates a step of the processing of the relevant information for DV ramping or switching according to an example of the present subject matter.

In one example, where multiple DVM controller instances 801 and 820 are present (as shown in FIG. 8B), a combination of the values for the desirable maximum signal peak power from all DVM controllers may be used to determine the respective DVM controller's peak power limit for the UTD. This combination may be the sum of all values for the desirable maximum signal peak power. The block 806 may consider this combination, a headroom, hardware capabilities, the current peak power capability and the desirable maximum signal peak power from the same DVM controller's block 805 and allocate for this DVM controller instance a peak power limit according to a rule which is common for all DVM controller instances. The radio unit's hardware capabilities and/or the current peak power capability may be signalled at least at the DVM controllers' initialization. The common rule may be preconfigured.

If the combined desirable maximum signal peak power exceeds the achievable peak power capability in the UTD, the peak power limit in block 806 is determined according to the common rule so that the drain voltage change is not larger than enabled by the power amplifier and its power supply during the transmission interruption period.

The identification of transmission interruption periods works the best for regularly occurring UL periods in TDD, which can be assumed to be commonly known by all scheduling instances and DVM controllers (provided with the TDD rhythm). However, an identification of an irregular transmission interruption period (such as a DTX period) or of an opportunity for inserting an irregular transmission interruption period may be different for each scheduler instance and the related DVM controller. As long as there is just a single DVM controller, these irregular transmission interruption periods can be handled properly by that single DVM controller. If, however, there are two or more DVM controller instances serving identical PAs from the same radio unit, each transmission interruption period which is utilized for changing the drain voltage needs to be applied commonly by all DVM controllers. Consequently, the information related to any identification or insertion of an irregular transmission interruption period needs to be exchanged between the corresponding DVM controller instances.

Figure 9A:
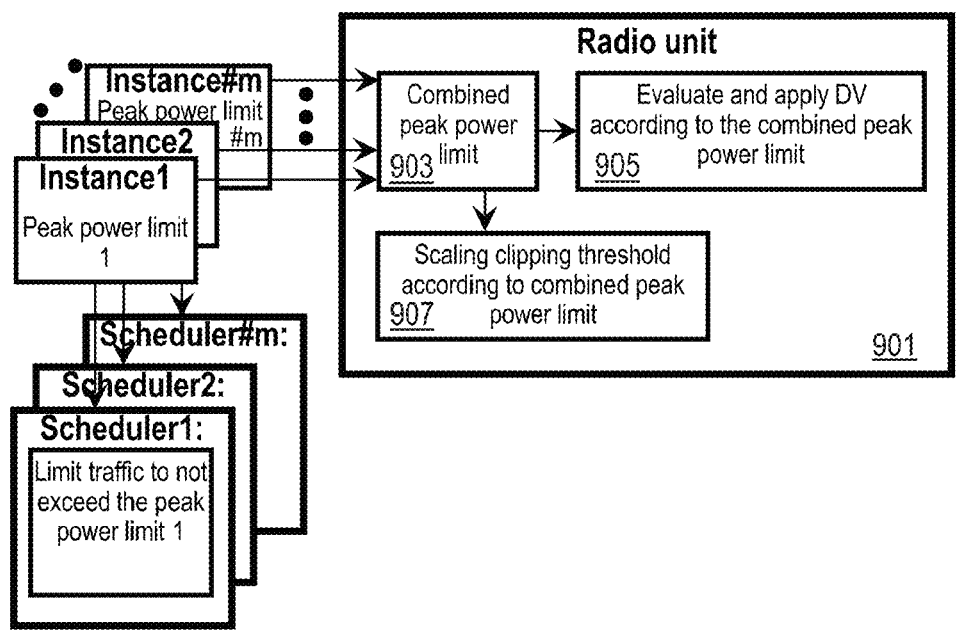
FIG. 9A illustrates a step of the processing of the relevant information for DV ramping or switching according to an example of the present subject matter.

FIG. 9A illustrates the processing of the relevant information for DV ramping or switching. In particular, FIG. 9A illustrates a signal processing example for the second step of traffic limitation and evaluation of the DV and the clipping threshold.

As shown in FIG. 9A each scheduler instance may receive from the associated DVM controller (e.g., 801) a respective peak power limit which was derived by this DVM controller. (Although FIG. 9A shows a one-to-one relationship between the instances 1 to m and the schedulers 1 to m, there may be fewer or even just a single DVM controller serving several or all schedulers.) Each scheduler instance may limit the traffic to not exceed the respective peak power limit.

In addition, the radio unit 901 may receive the peak power limits of the different instances. The radio unit 901 may compute a combined peak power limit 903 from the received peak power limits. The radio unit 901 may scale (907)

clipping threshold according to combined peak power limit 903. The radio unit 901 may evaluate and apply (905) DV according to the combined peak power limit.

In one example, if the DVM controller determines the peak power limit based on a beam, e.g. in case of multiple transmit paths as for multiple-input and multiple-output (MIMO), and if the radio unit determines the signals for the multiple transmit paths based on the information about the beams' signals and the respective beamforming coefficients, the individual peak power limits of the transmit paths may be weighted in block 903 based on the beamforming coefficients, e.g. their squared absolute values. In case a set of PAs is connected to the same DV power supply, the maximum of the evaluated DV values may be applied by block 905.

Figure 9B:
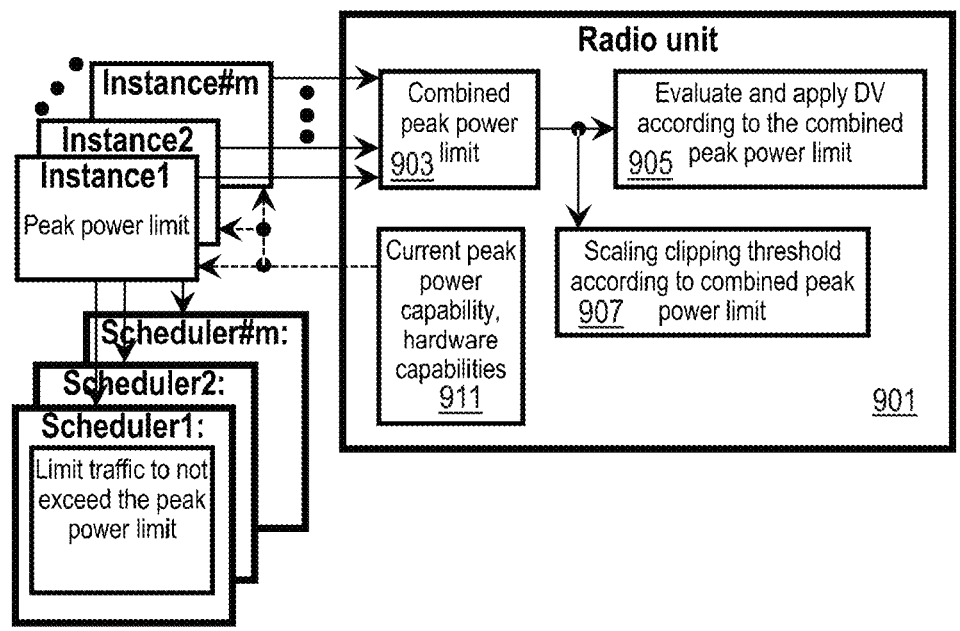
FIG. 9B illustrates a step of the processing of the relevant information for DV ramping or switching according to an example of the present subject matter.

In one example, the radio unit (as shown in FIG. 9B) may provide to the scheduler instances a current peak power capability and hardware capabilities 911.

Figure 10:
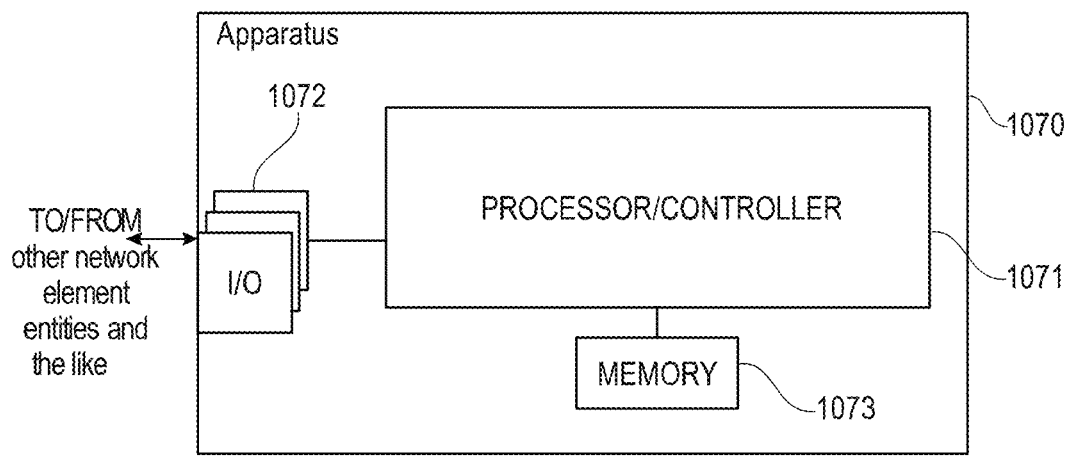
FIG. 10 is a block diagram showing an example of an apparatus according to an example of the present subject matter.

In FIG. 10, a block circuit diagram illustrating a configuration of an apparatus 1070 is shown, which is configured to implement at least part of the present subject matter. FIG. 10 may provide an example implementation of the means of the transmitter or the amplification apparatus according to the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 2 5A, 5B or 5C.

For example, the processor 1071 is configured for: Receiving a sequence of datasets of a low-latency application, each dataset of the datasets comprising a succession of a first sub-dataset and a second sub-dataset and successively transmitting radio frequency signals in an order of the sequence of the datasets such that a minimum fraction of the starting points of time is in an earliest scheduling time slot or in an earliest but one scheduling time slot of a transmission period of the transmission periods.

Alternatively, the processor 1071 is configured for: determining a power property for transmission of data in an entire upcoming scheduled transmission period, the power property indicating a power for transmission of the data; determining a drain voltage value for a power amplifier of the apparatus using the power property; determining whether an adjustment of the power amplifier to the determined drain voltage value requires an increase or allows for a reduction of a current drain voltage of the power amplifier; in case a reduction of the drain voltage is possible, identifying a transmission interruption period, of the pattern, that precedes the upcoming transmission period; and performing during the identified transmission interruption period a drain voltage reduction of the power amplifier to the determined drain voltage value; in case an increase of the drain voltage is required, performing during the transmission interruption period or transmission period a drain voltage increase of the power amplifier to the determined drain voltage value.

Figure 11:
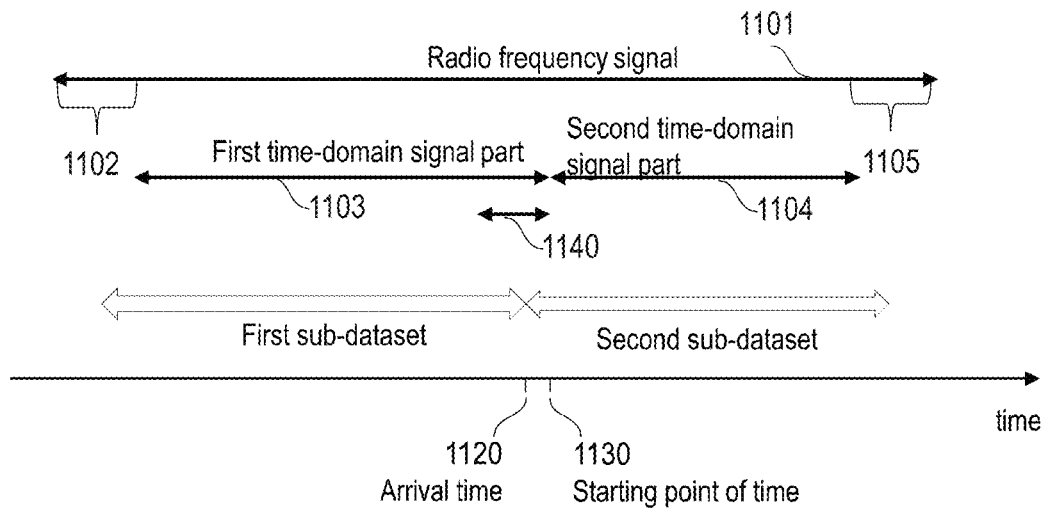
FIG. 11 illustrates the time coverage of a radio frequency signal in accordance with an example of the present subject matter.

FIG. 11 illustrates the time coverage of a radio frequency signal in accordance with an example of the present subject matter. The radio frequency signal may comprise a dataset comprising a first sub-dataset and a second sub-dataset.

The radio frequency signal as provided by the present subject matter may cover the radio frequency time interval 1101. The radio frequency signal comprises a first time-domain signal part that covers the first time segment 1103 and contains at least one transmission interruption period 1140 as well as a second signal part that covers the second time segment 1104 which begins at the starting point of time 1130. The differences 1102 and 1105 between the radio frequency time interval 1101 may, for example, comprise transmission interruption periods and/or radio frequency signal parts that may transmit data units which are not included in the first and second time-domain signal parts.

FIG. 11 shows when the transmitter receives the first sub-dataset and, beginning at the arrival time 1120, the second sub-dataset. It shows that the dataset may be transmitted during the first and second time-domain signal parts but also other parts of the radio frequency signal. It shows that the arrival time 1120 is before the starting point of time 1130.

Figure 12:
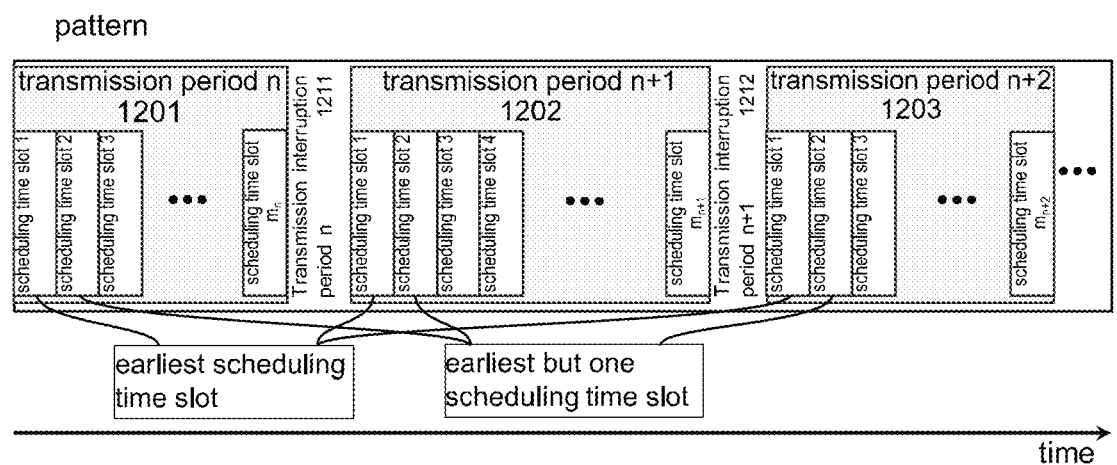
FIG. 12 illustrates a pattern in accordance with an example of the present subject matter.

FIG. 12 shows an example pattern. The pattern comprises transmission periods 1201, 1202 and 1203. The pattern further comprises transmission interruption periods 1211 and 1212. Each transmission period of the transmission periods is shown as comprising multiple scheduling time slots, where the earliest scheduling time slots and the earliest but one scheduling time slots are indicated.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. A transmitter for data transmission in a wireless communication system using a pattern comprising transmission periods,
   each transmission period of the transmission periods being split into one or more scheduling time slots, wherein each scheduling time slot of the transmission periods has a duration smaller than or equal to a duration threshold;
   each transmission period of the transmission periods starts when a transmission starts in the transmission period and ends when the transmission in the transmission period ends,
   wherein the transmitter is configured for:
      receiving a sequence of datasets of a low-latency application, each dataset of the datasets comprising a succession of a first sub-dataset and a second sub-dataset;
      successively transmitting radio frequency signals in an order of the sequence of the datasets such that the number of the radio frequency signals is equal to the number of the datasets, each radio frequency signal of the radio frequency signals comprising a dataset of the datasets;
   wherein each radio frequency signal of the radio frequency signals comprises:
      a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration longer than or equal to a minimum duration; and
      a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, each second time segment of the second time segments having a starting point of time;
   wherein the transmitter is configured to perform the transmitting of the radio frequency signals such that:
      a minimum fraction of the starting points of time is adjacent to the end of the first time segment and in an earliest scheduling time slot or in an earliest but one scheduling time slot of a transmission period of the transmission periods.

2. The transmitter of claim 1, wherein each second sub-dataset of the second sub-datasets starts being received at the transmitter at a point of time, referred to as arrival time, wherein each arrival time of the arrival times has a constant probability density over a period of time that has a duration higher than or equal to the minimum duration and a probability density of zero outside this period of time.

3. The transmitter of claim 1, each first sub-dataset being provided at a rate smaller than a first data rate and each second sub-dataset being provided at a rate higher than a second data rate.

4. The transmitter of claim 1, wherein the first time segment ends with a transmission interruption period.

5. The transmitter of claim 3, wherein the first time-domain signal part comprises the first sub-dataset and a first portion of the second sub-dataset, wherein the second time-domain signal part comprises at least part of a remaining second portion of the second sub-dataset, wherein the second data rate is higher than the first data rate.

6. The transmitter of claim 2, wherein the absolute value of the difference between the first data rate and the second data rate is higher than a threshold.

7. The transmitter of claim 1, wherein the transmitter is configured to create the second time-domain signal part in response to an event, the event comprising:
- an arrival of the second sub-dataset at the arrival time; or
- receiving a request of increasing data rate to higher than a second data rate, the request being received by the transmitter from a receiver of data of the low-latency application or from an application server that provides the data of the low-latency application, wherein each second sub-dataset is provided at a rate higher than the second data rate.

8. The transmitter of claim 7, wherein the event has occurred at the beginning of a transmission period.

9. The transmitter of claim 1, wherein the minimum fraction of the starting points of time is in the earliest scheduling time slot.

10. The transmitter of claim 1, wherein the sequence of datasets comprises at least 100 datasets, wherein the minimum fraction is more than 50% of the starting points of time.

11. The transmitter of claim 1, wherein the minimum duration is at least 10 milliseconds.

12. The transmitter of claim 1, wherein the duration threshold is one millisecond.

13. The transmitter of claim 1, wherein the certain interruption duration is smaller than or equal to 2.5 milliseconds.

14. The transmitter of claim 1, wherein the first bandwidth threshold is a first fraction of a maximum bandwidth that the transmitter uses, wherein the second bandwidth threshold is a second fraction of the maximum bandwidth.

15. The transmitter of claim 14, the first fraction being 50% or 60%.

16. The transmitter of claim 14, the second fraction being 70% and the first fraction being 50%.

17. The transmitter of claim 14, the second fraction being higher than the first fraction by at least 25% of the maximum bandwidth.

18. A method for data transmission in a wireless communication system using a pattern comprising transmission periods, each transmission period of the transmission periods being split into one or more scheduling time slots, wherein each scheduling time slot of the transmission periods has a duration smaller than or equal to a duration threshold; each transmission period of the transmission periods starts when a transmission starts in the transmission period and ends when the transmission in the transmission period ends, the method comprising:
- receiving a sequence of datasets of a low-latency application, each dataset of the datasets comprising a succession of a first sub-dataset and a second sub-dataset;
- successively transmitting radio frequency signals in an order of the sequence of the datasets such that the number of radio frequency signals is equal to the number of the datasets, each radio frequency signal of the radio frequency signals comprising a dataset of the datasets;

wherein each radio frequency signal of the radio frequency signals comprises:
- a first time-domain signal part comprising at least part of the first sub-dataset of the dataset, the first time-domain signal part covering a first time segment and having an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration longer than or equal to a minimum duration; and
- a second time-domain signal part comprising at least part of the second sub-dataset of the dataset, the second time-domain signal part covering a second time segment and having an occupied bandwidth that is higher than or equal to a second bandwidth threshold, the second bandwidth threshold being higher than the first bandwidth threshold, each second time segment of the second time segments having a starting point of time;

wherein the transmitting of the radio frequency signals is performed such that:
- a minimum fraction of the starting points of time is adjacent to the end of the first time segment and in an earliest scheduling time slot or in an earliest but one scheduling time slot of a transmission period of the transmission periods.

19. A transmitter for data transmission in a wireless communication system using a pattern comprising transmission periods,
- each transmission period of the transmission periods being split into one or more scheduling time slots, wherein each scheduling time slot of the transmission periods has a duration smaller than or equal to a duration threshold;
- each transmission period of the transmission periods starts when a transmission starts in the transmission period and ends when the transmission in the transmission period ends, wherein the transmitter is configured for:
- receiving a sequence of datasets of a low-latency application, each dataset of the datasets comprising a succession of a first sub-dataset and a second sub-dataset, wherein each second sub-dataset of the second sub-datasets starts being received at the transmitter at a point of time, referred to as arrival time;
- successively transmitting radio frequency signals in an order of the sequence of the datasets such that the number of radio frequency signals is equal to the number of the datasets, each radio frequency signal of the radio frequency signals comprising a dataset of the datasets, wherein the radio frequency signals comprise symbols that are associated with a modulation scheme having a modulation order;

wherein each radio frequency signal of the radio frequency signals comprises:
- a first time-domain signal part comprising at least part of the first sub-dataset of the dataset, the first time-domain signal part covering a first time segment and having at least until the arrival time an occupied bandwidth that is smaller than or equal to a first bandwidth threshold, the first time segment comprising one or more transmission interruption periods, wherein each transmission interruption period has a duration smaller than a certain interruption duration which is compliant with a latency requirement of the low-latency application, wherein the first time segment has a duration higher than or equal to a minimum duration, wherein, in the first time-domain signal part, an absolute majority of symbols used for data transmission during any scheduling time slot having an occupied bandwidth higher than the first bandwidth threshold and during a last scheduling time slot of the first time-domain signal part, respectively, is associated with modulation orders that are lower than a certain modulation order; and a second time-domain signal part comprising at least part of the second sub-dataset of the dataset, the second time-domain signal part covering a second time segment and having an occupied bandwidth that is longer than or equal to a second bandwidth threshold, the second bandwidth threshold being higher than the first bandwidth threshold, wherein the end of the first time segment is adjacent to the beginning of the second time segment, each second time segment of the second time segments having a starting point of time, wherein at least half of the symbols used for data transmission is, in each of the second time-domain signal part's scheduling time slots, associated with modulation orders that are higher than or equal to the certain modulation order;

wherein the transmitter is configured to perform the transmitting of the radio frequency signals such that:

a minimum fraction of the starting points of time is in an earliest scheduling time slot or in an earliest but one scheduling time slot of a transmission period of the transmission periods.

20. The transmitter of claim 19, wherein each arrival time of the arrival times has a constant probability density over a period of time that has a duration higher than or equal to the minimum duration and a probability density of zero outside this period of time.

* * * * *